(12) United States Patent
Kapasi et al.

(10) Patent No.: US 12,170,765 B2
(45) Date of Patent: *Dec. 17, 2024

(54) HIERARCHICAL PACKING OF SYNTAX ELEMENTS

(71) Applicant: OL Security Limited Liability Company, Dover, DE (US)

(72) Inventors: Ujval J. Kapasi, Westford, MA (US); Amit Gulati, San Mateo, CA (US); John Sievers, North Reading, MA (US); Yipeng Liu, Sunnyvale, CA (US); Dan Miller, Campbell, CA (US)

(73) Assignee: OL Security Limited Liability Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/131,470

(22) Filed: Apr. 6, 2023

(65) Prior Publication Data

US 2023/0247197 A1    Aug. 3, 2023

Related U.S. Application Data

(60) Continuation of application No. 17/098,699, filed on Nov. 16, 2020, now Pat. No. 11,665,342, which is a
(Continued)

(51) Int. Cl.
*H04N 19/115* (2014.01)
*H04N 19/176* (2014.01)
(Continued)

(52) U.S. Cl.
CPC ......... *H04N 19/115* (2014.11); *H04N 19/176* (2014.11); *H04N 19/43* (2014.11);
(Continued)

(58) Field of Classification Search
CPC .... H04N 19/115; H04N 19/176; H04N 19/43; H04N 19/433; H04N 19/436;
(Continued)

(56) References Cited

U.S. PATENT DOCUMENTS 5,493,514 A    2/1996  Keith et al.
5,808,700 A *  9/1998  Sugimoto .............. H04N 19/43
                                            375/E7.1
(Continued)

OTHER PUBLICATIONS

JM H.264/AVC Reference Software Manual, Jul. 3, 2009, available at http://iphome.hhi.de/suehring/tml/JM%20Reference%20Software%20Manual%20%28JVT-AE010%29.pdf.
(Continued)

*Primary Examiner* — Michael J Moore, Jr.

(57) ABSTRACT

Instructions embedded on a computer-readable medium, when executed on one or more computer devices, improve video coding performance while using a merge mode in motion estimation. The instructions comprise instructions to perform one or more refinement searches on a plurality of candidate regions of a current frame. The instructions also comprise instructions to determine one or more distortion values based, at least in part, on reduced candidate regions and instructions to code motion data based, at least in part, on the one or more refinement searches.

27 Claims, 14 Drawing Sheets

Related U.S. Application Data continuation of application No. 15/607,474, filed on May 27, 2017, now Pat. No. 10,841,579, which is a continuation of application No. 14/513,191, filed on Oct. 13, 2014, now Pat. No. 9,667,962, which is a continuation of application No. 12/192,841, filed on Aug. 15, 2008, now Pat. No. 8,861,611, which is a division of application No. 11/973,889, filed on Oct. 9, 2007, now Pat. No. 8,213,509.

(60) Provisional application No. 60/849,857, filed on Oct. 6, 2006.

(51) Int. Cl.
*H04N 19/43* (2014.01)
*H04N 19/433* (2014.01)
*H04N 19/436* (2014.01)
*H04N 19/46* (2014.01)
*H04N 19/51* (2014.01)
*H04N 19/53* (2014.01)
*H04N 19/533* (2014.01)
*H04N 19/56* (2014.01)
*H04N 19/61* (2014.01)

(52) U.S. Cl.
CPC ......... *H04N 19/433* (2014.11); *H04N 19/436* (2014.11); *H04N 19/46* (2014.11); *H04N 19/51* (2014.11); *H04N 19/53* (2014.11); *H04N 19/533* (2014.11); *H04N 19/56* (2014.11); *H04N 19/61* (2014.11)

(58) Field of Classification Search
CPC ........ H04N 19/46; H04N 19/51; H04N 19/53; H04N 19/533; H04N 19/56; H04N 19/61
USPC ................. 375/240.01–240.29; 382/232–254
See application file for complete search history.

(56) References Cited

U.S. PATENT DOCUMENTS

| | | | |
|---|---|---|---|
| 6,006,318 A | 12/1999 | Hansen et al. | |
| 6,192,384 B1 | 2/2001 | Dally et al. | |
| 6,269,435 B1 | 7/2001 | Dally et al. | |
| 6,504,855 B1 | 1/2003 | Matsunaga | |
| 6,968,010 B2* | 11/2005 | Chelladurai | H04N 19/14 375/240.22 |
| 6,996,176 B1* | 2/2006 | Chang | H04N 19/59 375/E7.114 |
| 7,099,392 B2* | 8/2006 | Kim | H04N 19/53 375/E7.122 |
| 7,100,026 B2 | 8/2006 | Dally et al. | |
| 7,457,361 B2* | 11/2008 | Zhu | H04N 19/533 375/240.16 |
| 7,523,234 B2* | 4/2009 | Yin | H04N 19/61 710/68 |
| 7,526,028 B2* | 4/2009 | Sung | H04N 19/53 382/238 |
| 7,693,219 B2* | 4/2010 | Yan | H04N 19/57 348/420.1 |
| 7,751,482 B1* | 7/2010 | Srinivasan | H04N 19/523 375/240.15 |
| 7,940,844 B2* | 5/2011 | Lai | H04N 19/51 375/240.24 |
| 8,073,056 B2* | 12/2011 | Kim | H04N 5/145 375/240.26 |
| 8,213,509 B2* | 7/2012 | Kapasi | H04N 19/53 375/240.12 |
| 11,665,342 B2* | 5/2023 | Kapasi | H04N 19/53 375/240.23 |
| 2002/0172287 A1* | 11/2002 | Kim | H04N 5/145 375/E7.122 |
| 2003/0021344 A1* | 1/2003 | Panusopone | H04N 19/53 375/E7.113 |
| 2004/0008780 A1* | 1/2004 | Lai | H04N 19/61 375/E7.101 |
| 2004/0190613 A1* | 9/2004 | Zhu | H04N 19/533 375/240.12 |
| 2005/0018772 A1* | 1/2005 | Sung | H04N 19/56 375/E7.118 |
| 2005/0074062 A1 | 4/2005 | Sung et al. | |
| 2006/0018381 A1* | 1/2006 | Luo | H04N 19/52 375/E7.125 |
| 2006/0133495 A1* | 6/2006 | Ye | H04N 19/61 375/E7.123 |
| 2006/0188020 A1* | 8/2006 | Wang | H04N 19/40 375/E7.122 |
| 2006/0233258 A1* | 10/2006 | Holcomb | H04N 19/533 375/E7.113 |
| 2006/0256854 A1 | 11/2006 | Jiang | |
| 2006/0265445 A1 | 11/2006 | Gustavson et al. | |
| 2007/0064805 A1* | 3/2007 | Carrig | H04N 19/513 375/E7.129 |
| 2007/0098276 A1 | 5/2007 | Reese | |
| 2007/0183500 A1* | 8/2007 | Nagaraj | H04N 19/103 375/240.24 |
| 2007/0237232 A1* | 10/2007 | Chang | H04N 19/51 375/240.26 |
| 2007/0237235 A1 | 10/2007 | Krishnan | |
| 2007/0286286 A1* | 12/2007 | Heng | H04N 19/40 375/E7.092 |
| 2008/0117978 A1* | 5/2008 | Kapasi | H04N 19/533 375/E7.101 |
| 2009/0046939 A1 | 2/2009 | Sakuyama et al. | |
| 2010/0177826 A1* | 7/2010 | Bhaumik | H04N 19/51 375/E7.125 |
| 2010/0239015 A1* | 9/2010 | Wang | H04N 19/147 375/E7.026 |

OTHER PUBLICATIONS

U.S. Appl. No. 11/973,889, filed Oct. 6, 2006.
U.S. Appl. No. 12/192,829, filed Aug. 15, 2008.
U.S. Appl. No. 12/192,841, filed Aug. 15, 2008.

* cited by examiner

HIERARCHICAL PACKING OF SYNTAX ELEMENTS

CROSS-REFERENCES TO RELATED APPLICATIONS

This application is a continuation of U.S. patent application Ser. No. 17/098,699, (now U.S. Pat. No. 11,665,342) filed Nov. 16, 2020, and entitled "Hierarchical Packing of Syntax Elements," which is a continuation of U.S. patent application Ser. No. 15/607,474 (now U.S. Pat. No. 10,841,579), filed May 27, 2017, and entitled "Hierarchical Packing of Syntax Elements," which is a continuation of U.S. patent application Ser. No. 14/513,191 (now U.S. Pat. No. 9,667,962), filed Oct. 13, 2014, and entitled "Hierarchical Packing of Syntax Elements," which is a continuation of U.S. patent application Ser. No. 12/192,841 (now U.S. Pat. No. 8,861,611), filed Aug. 15, 2008, and entitled "Hierarchical Packing of Syntax Elements," which is a division of U.S. patent application Ser. No. 11/973,889 (now U.S. Pat. No. 8,213,509), filed Oct. 9, 2007, and entitled "Video Coding on Parallel Processing Systems," which claims priority from U.S. Provisional Application No. 60/849,857, filed Oct. 6, 2006, and entitled "Methods for Video Coding on Parallel Processing Systems." The disclosures of all of the foregoing patent applications are herein incorporated by reference in their entireties.

TECHNICAL FIELD

This application relates generally to the field of software engineering and video coding. Specifically, it relates to software implementations of video coding on digital computer systems that operate multiple processing units in parallel, and, more specifically, to video coding for video processing, video compression, and video decompression.

BACKGROUND

A video typically comprises a number of still images ("frames") presented in sequence, one after another. In digital videos, each frame may be digitally encoded as a series of bits (or bytes), however resource limitations (e.g. storage space and/or network bandwidth) often place a cap on the total number of bits that can be used to represent each frame, which can effectively limit the overall quality of the video. Thus, one of the main goals of video encoding has been to encode the video in a way which meets a target bitrate while maximizing video quality.

One way of accomplishing this is to encode only the "differences" between each of the frames. For example, "motion" is often isolated to certain regions of a frame at any given time. In other words, not every pixel of a given frame will be changed in the next frame. Thus, rather than re-encoding every pixel of every frame, which would require a very high bitrate, only the pixel differences between consecutive frames are encoded.

FIG. 1 illustrates a method of motion estimation. The method of FIG. 1 comprises frames 110 and 120, a frame element 122, and a macroblock 123. Frame 120 corresponds to the frame currently being encoded, while frame 110 corresponds to the frame that was just previously encoded. The macroblock 123 comprises a plurality of adjacent pixels within frame 120, on which motion estimation is currently being performed. Motion estimation is the process of finding the "best match" from frame 110 for the macroblock 123 in the frame 120. The frame 110 is searched at several search points within a search region 111, and the pixels at each search point are compared with the pixels in the macroblock 123. Search points are represented with motion vectors, and a best motion vector 115 indicates the relative pixel displacement in the horizontal and vertical directions between the location of the best match block 113 in frame 110 and the relative location of the current macroblock 123. Once the best match 113 is found, block based video compression algorithms will encode the pixel differences between the current macroblock 123 and the best match block 113, rather than encoding the actual pixels themselves. Since a relatively good match can often be found in natural video scenes, this technique drastically reduces the amount of data that needs to be encoded into the bitstream, even after accounting for the extra bits used to encode the motion vectors themselves. The decoder then adds these differences to the best match 113, which is extracted using the encoded motion vector. This process is known as "motion compensation."

FIG. 2 illustrates a method of encoding a macroblock using motion estimation. Referring back the example of FIG. 1, the macroblock 223 corresponds to the macroblock 123 of frame 120, and the macroblock 213 corresponds to the best match block 113 of frame 110. Block 130 represents the difference between the macroblocks 223 and 123 which, in this case, is a block of zeroes. Thus, the encoder will only need to encode this block of zeroes, and will store it into the bitstream along with a corresponding motion vector. These will then be used by the decoder to reconstruct a macroblock that corresponds to macroblock 223. Many video compression algorithms provide very efficient ways of encoding zeroes (i.e., fewer bits are required), thus better matches produced by the motion estimation process will result in a fewer number of bits encoded into the bitstream.

When looking for the best motion vector, the metric that is being minimized when finding the best match is the total number of bits produced when encoding the entire video sequence. However, the motion estimation algorithm used in encoding the current macroblock can affect the number of bits used by future macroblocks in unforeseen ways. Thus, it is extremely difficult to calculate the impact that choosing a particular motion vector for a single macroblock has on the size of the entire video sequence. One possible approach is to minimize the number of bits required to encode just the current macroblock. However, this can also be too computationally expensive, so a reasonable approximation is to use a simple distortion metric, such as the sum of absolute differences (SAD), between the pixels in the two blocks.

Further complicating the motion estimation problem is the sheer number of operations required to do an exhaustive search for the best block match, even if an approximation metric such as SAD is used. In addition, a large amount of data memory must be frequently accessed during such a search, thus a straightforward algorithm (i.e., one that searches for the best match by comparing every possible macroblock location in the previous frame to the macroblock being encoded in the current frame; also known as a "brute-force" full search) would perform poorly on an embedded processor that might not have a cache large enough to hold all of the pixels from the previous frame. Thus, there remains a need to search for a best match both efficiently and accurately. The increasing popularity and performance of parallel processors further necessitates a means for video coding which takes full advantage of such parallel processing capabilities.

BRIEF DESCRIPTION OF THE DRAWINGS

The present invention is illustrated by way of example, and not by way of limitation, in the following drawings and in which like reference numerals refer to similar elements.

DETAILED DESCRIPTION

In embodiments of the present invention, several areas of interest ("candidates") are identified in a reference frame, and refinement searches are then performed within small windows around each candidate ("candidate search regions"). Each successive refinement search processes a finer resolution. Within a refinement stage, each macroblock is compared to the reference frame on one or more candidate search regions. For example, a candidate search region may include a motion vector. In yet other embodiments of the invention, methods are disclosed for fast and efficient video coding on parallel processing environments.

Figure 1:
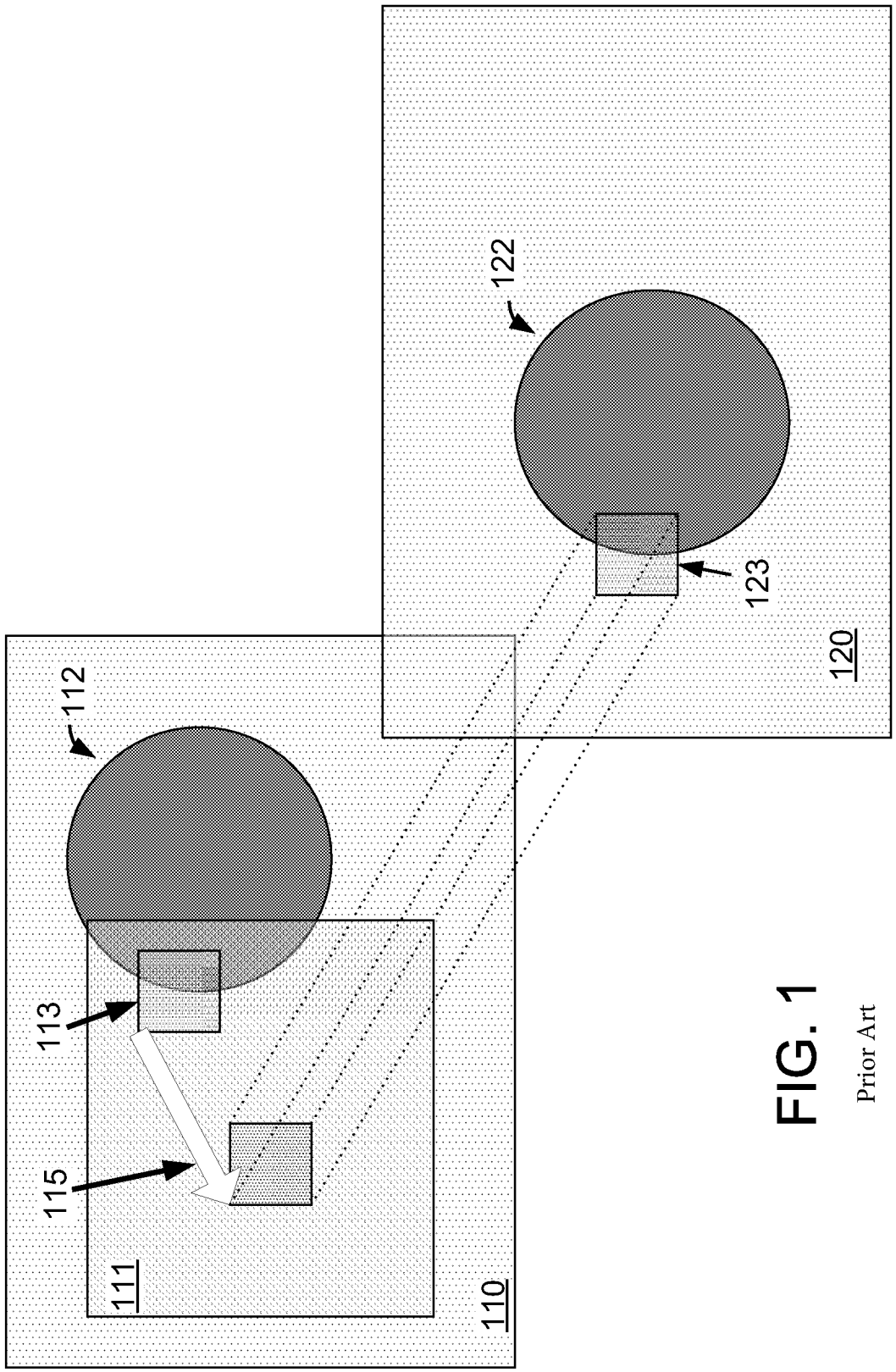
FIG. 1 illustrates a method of motion estimation.
Figure 2:
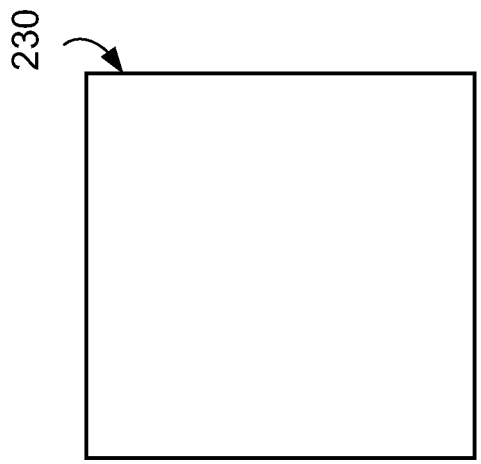
FIG. 2 illustrates a method of encoding a macroblock.
Figure 2:
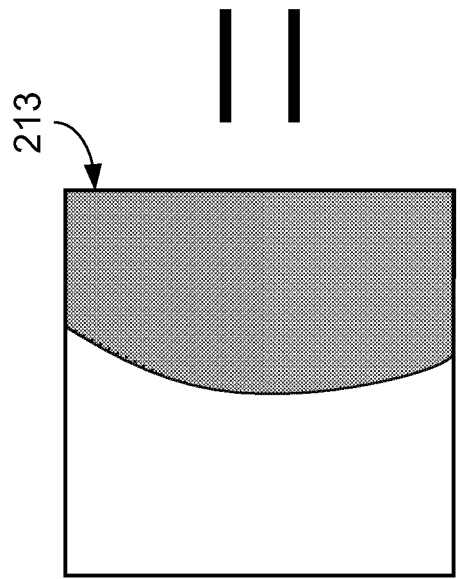
Figure 2:
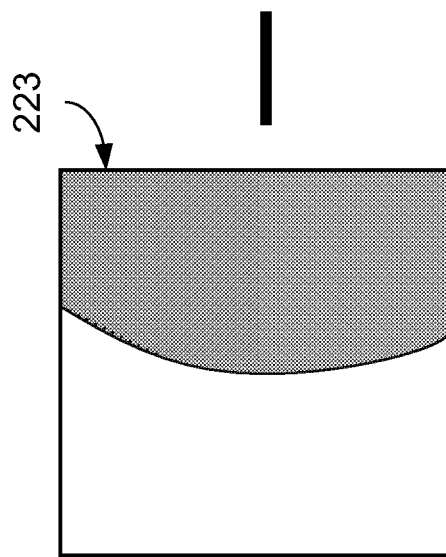
Figure 3:
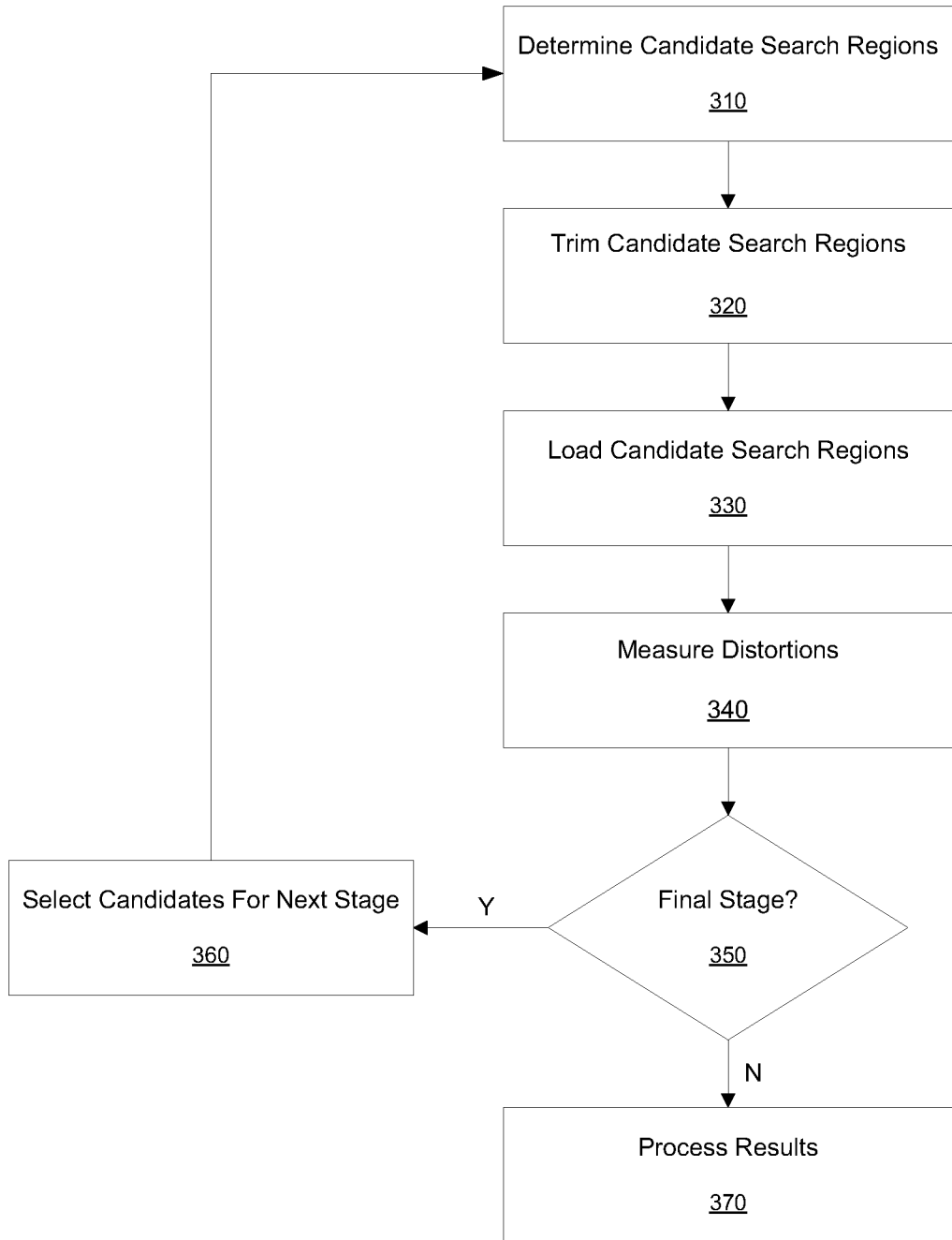
FIG. 3 illustrates a refinement search according to an embodiment of the invention.

FIG. 3 illustrates a refinement stage according to an embodiment of the invention. At 310, one or more motion vectors are identified as candidate search regions. Candidate search regions may be determined from a number of different sources. For example, candidate search regions may include: the best motion vectors from a previous frame; the best motion vectors from a previous refinement stage; the best motion vectors for previous macroblocks in the same refinement stage; and/or the current estimate of the predicted motion vector. Furthermore, candidate search regions may include any other motion estimation steps that might precede the refinement stage. For example, a brute force full search may be executed before the refinement stage to provide coverage over a large enough area, thus ensuring that the candidates comprise one or more initial motion vectors that roughly match the motion in the video sequence. In an embodiment, this search may be performed at a low resolution in order to save computation resources. Alternatively, the search may be implemented as a separate pipeline in order to ensure as large of a search range as possible.

Figure 4:
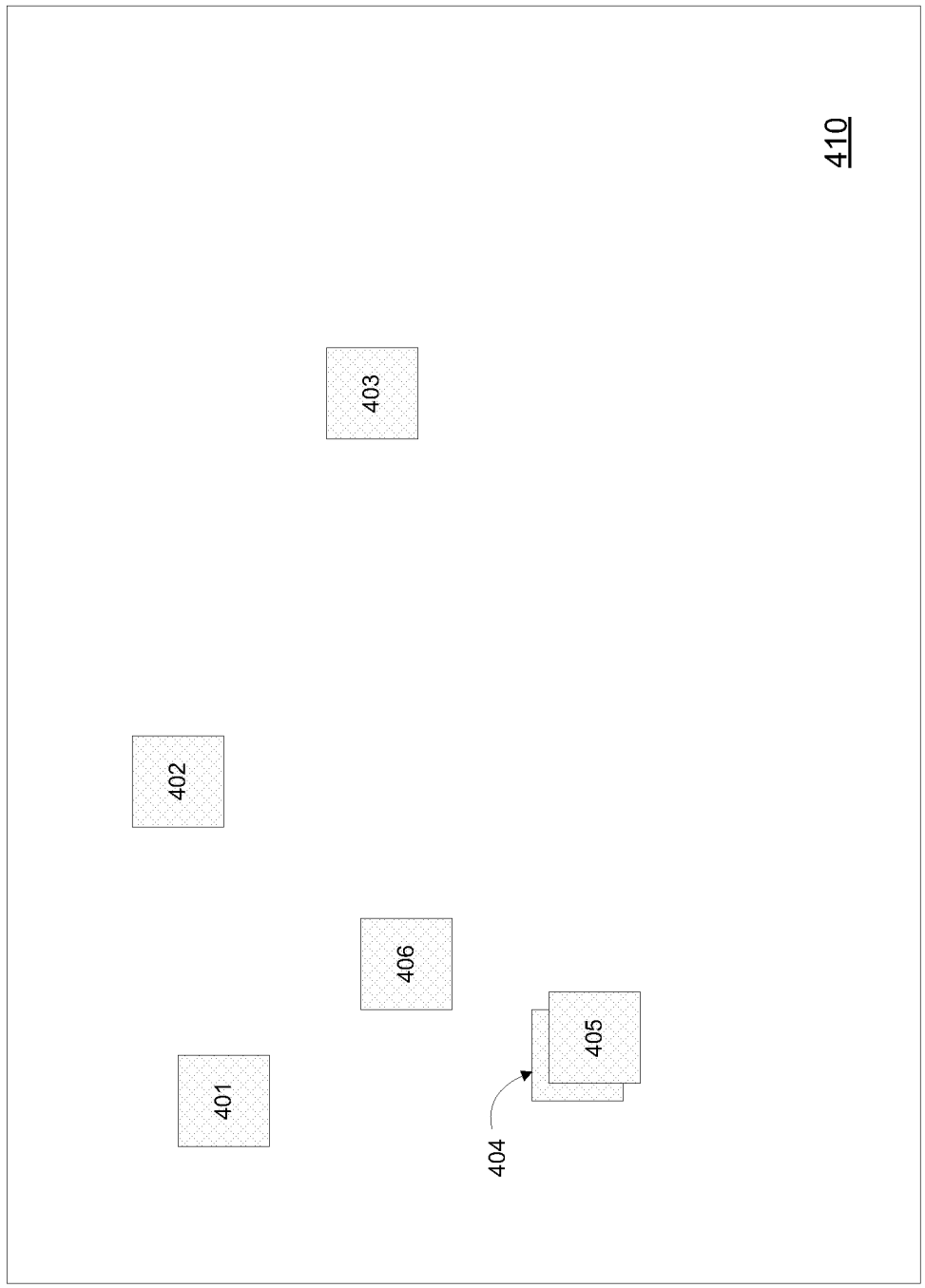
FIG. 4 illustrates a determination of candidate search regions according to an embodiment of the invention.

FIG. 4 illustrates a determination of candidate search regions according to an embodiment of the invention. The embodiment of FIG. 4 comprises a reference frame 410 and candidate motion vectors 401-406. In this example, candidate 401 is the best candidate resulting from a low resolution full search of the current macroblock, candidates 402-405 are the best candidates from a previous refinement stage for the same macroblock, and candidate 406 is the current estimate of the predicted best motion vector.

Referring back to FIG. 3, at 320, the total size of the candidate pool is trimmed down to isolate the search to only the "best" candidates, thus limiting the computation resources used by each macroblock. In an embodiment, redundant candidates are always trimmed ("merged"). In other embodiments, candidates that are close in proximity are also merged. For example, two candidates may be considered close in proximity if one is within the search range of the other. When merging two or more candidates, the candidate that is kept is typically the one closest to the current estimation of the predicted motion vector. Thus allows more diversity in the resulting candidates, and reduces the overall amount of computation by eliminating overlapping candidate regions. This may help achieve real-time performance constraints while allowing different macroblocks to search different numbers of candidates. If, after merging candidates, the number of remaining candidates is still more than the load-balancing constraint, then the best candidates are chosen based on their proximities to the predicted motion vector. For example, a candidate that is closer to the predicted motion vector may be preferable to one farther away. In alternative embodiments, all the candidates of a particular macroblock may be eliminated, which is known as an "early exit". For example, this may be useful if it is known that many macroblocks will find a near perfect match with respect to a particular motion vector (i.e., any further improvements would not be significant enough to warrant the amount of computation required to do so). In an embodiment, a load-balancing algorithm is used to control the maximum number of the best candidates. The load-balancing mechanism sets a constraint on how many candidates are searched for each individual macroblock, while ensuring that the total amount of required computation does not exceed the available resources. Thus, macroblocks that are more complex can be allowed to search more candidates, while simpler macroblocks can be constrained to search fewer candidates. In an embodiment, the load-balancing mechanism tracks a running weighted average of the number of candidate vectors searched per macroblock.

Figure 5:
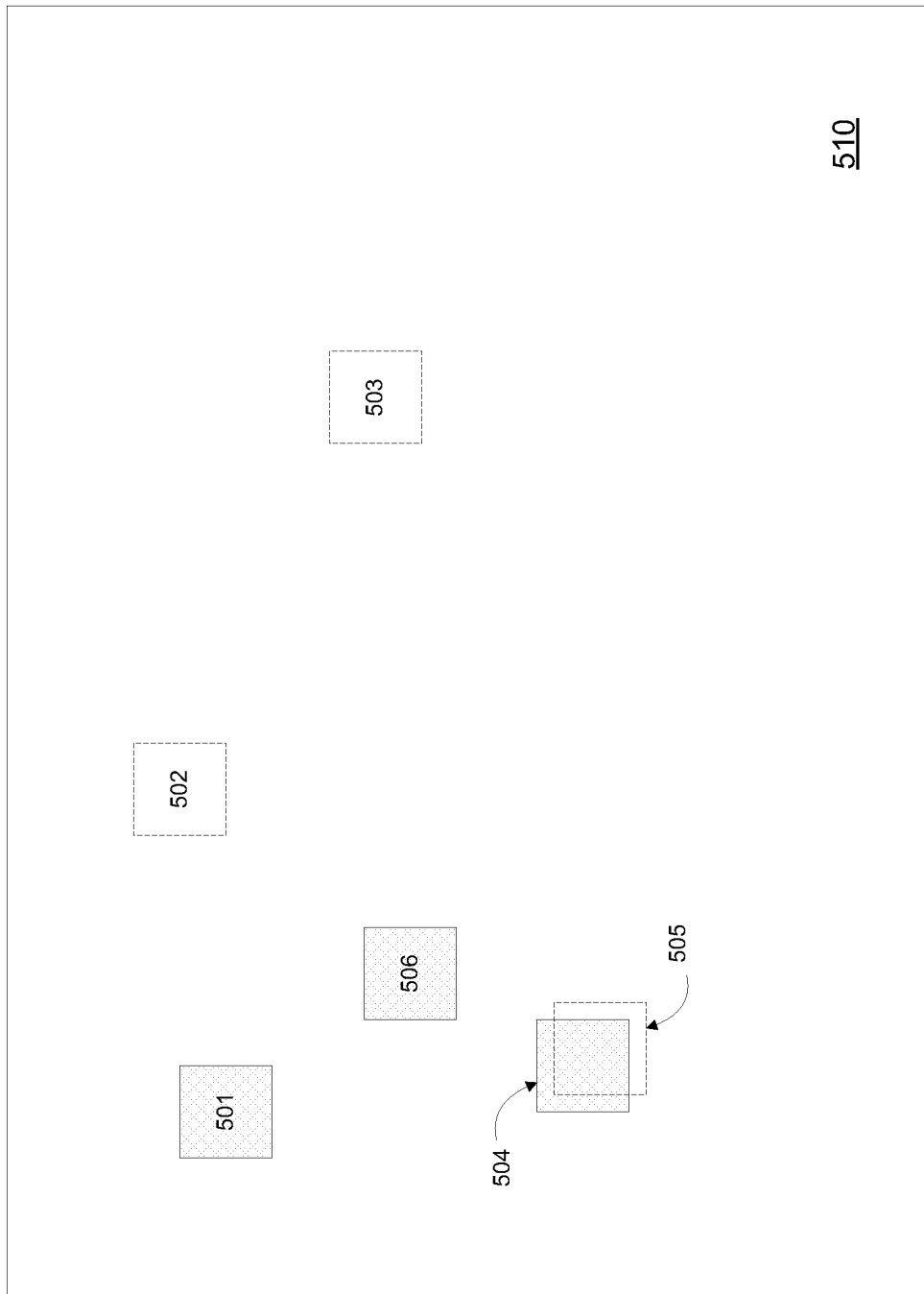
FIG. 5 illustrates a trimming of the candidate pool according to an embodiment of the invention.

FIG. 5 illustrates a trimming of the candidate pool according to an embodiment of the invention. The embodiment of FIG. 5 comprises a reference frame 510 and candidate motion vectors 501-506. For the purposes of discussion, it is assumed that the reference frame 510 corresponds to the reference frame 410, of FIG. 4, and the candidates 501-506 correspond to candidates 401-406, of FIG. 4, respectively. Continuing off the example of FIG. 4, it is assumed that there is a load-balancing constraint of three candidates. In other words, at most three of the candidate motion vectors 501-506 may be kept, and thus three of them must be trimmed. It should first be noted that candidate 505 is very close in proximity to candidate 504, thus both candidates 505 and 504 may be merged into one candidate. In this case candidate 504 is kept since it is closest in proximity to the predicted best motion vector 506. Of the remaining candidates 501-503 and 506, candidates 502 and 503 are the farthest in proximity from the predicted best motion vector 506. Thus, candidates 502 and 503 are trimmed, leaving candidates 501, 504, and 506 as the three remaining best candidates at the end of this step.

Referring back to FIG. 3, at step 330, the best candidate search regions are loaded (extracted) from the reference frame. In an embodiment, each candidate is individually loaded to an off-chip dynamic access memory ("DRAM"). However, overlapping data for various candidates of the same macroblock, and between candidates of different macroblocks, may be subsequently loaded in this manner as well. In another embodiment, a hardware cache may be used to mitigate the wasting of DRAM bandwidth on overlapping candidate loads. In an alternative embodiment, only the relevant portion of the reference frame may be kept in on-chip memory, thus reducing the required memory bandwidth. For example, this may be implemented as a software form of caching. In an embodiment, the search area is in the shape of a square or rectangle. In alternative embodiments, the search area may take any form. For example, the search area may be in the shape of a diamond. In yet another embodiment, a directional search may be performed on only one side of the candidate motion vector. In this case, the gradient of the search space is determined, based on the best vector(s) from the previous refinement stages, and computation may be saved by guiding the search in a particular direction.

Figure 6:
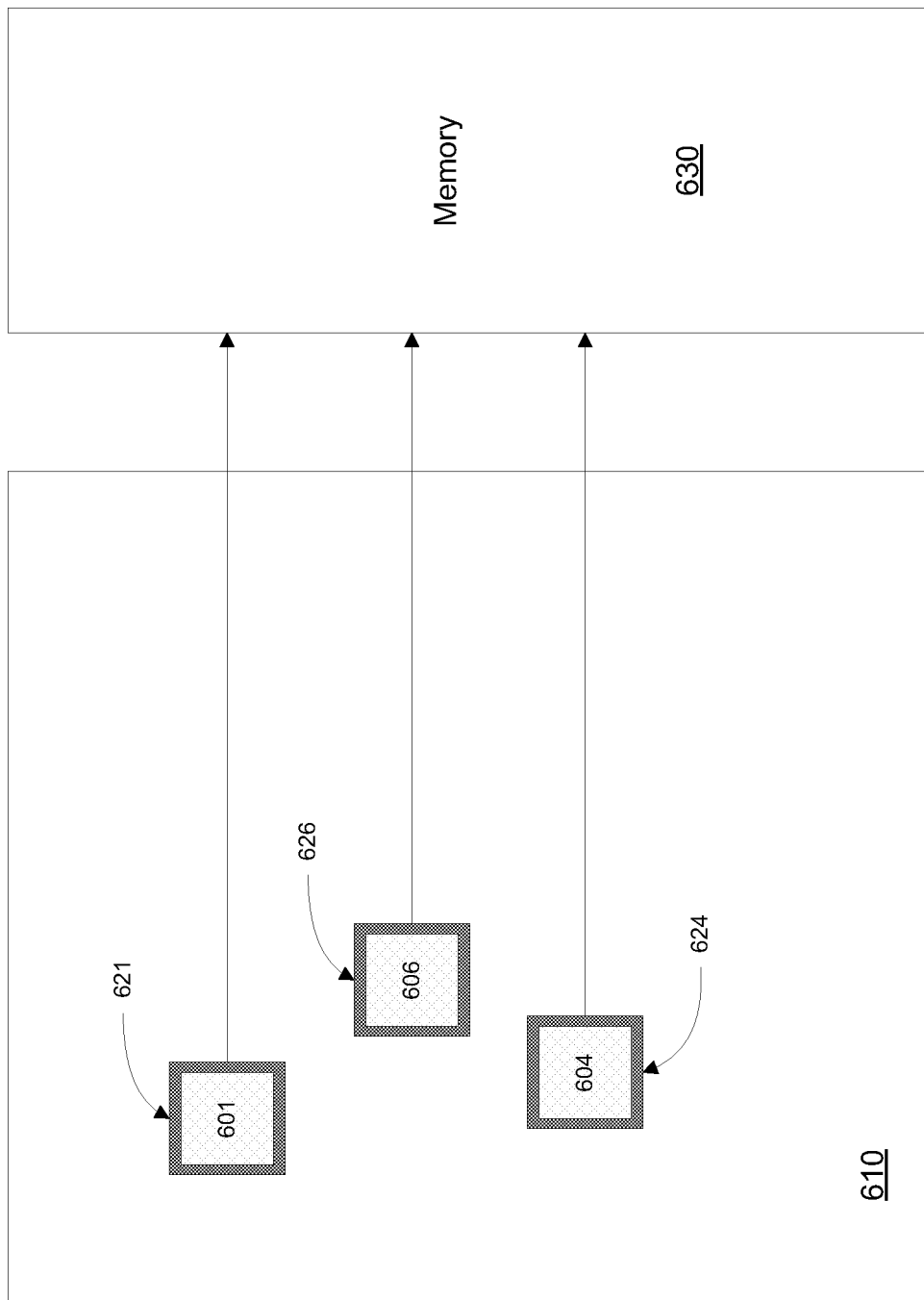
FIG. 6 illustrates a loading of candidate search regions according to an embodiment of the invention.

FIG. 6 illustrates a loading of candidate search regions according to an embodiment of the invention. The embodiment of FIG. 6 comprises: a reference frame 620; candidate motion vectors 601, 604, and 606; candidate search regions 621, 624, and 626; and a storage element 630. The search regions 621, 624, and 626 are rectangular in shape and centered about the candidate motion vectors 601, 604, and 606, respectively. For example, if the motion vector 601 is defined by (x1, y1), then the search region 621 may be defined as the region from (x1−1, y1−1) to (x1+1, y1+1). Along the same lines, if the motion vector 604 is defined by (x4, y4), then the search region 624 may be defined as the region from (x4−1, y4−1) to (x4+1, y4+1). And if the motion vector 606 is defined by (x6, Y6), then the search region 626 may be defined as the region from (x6−1, y6−1) to (x6+1, y6+1). The candidate search regions 621, 624, and 626 are then extracted and loaded into the storage element 630. In an embodiment, the storage element 630 is an on-chip memory. In alternative embodiments, the candidate search regions 621, 624, and 626 may be loaded directly from an off-chip DRAM.

Referring back to FIG. 3, at step 340, distortions are measured at several search points around each candidate motion vector. For example, the distortion measurement may comprise: a sum of absolute differences (SAD); a sum of squared errors (SSE); or a Hadamard transform. In an embodiment, the total number of operations may be reduced by using only a subset of the pixels in the block. In another embodiment, the total number of operations may be reduced through an initial "sub-sampling" of the pixels. In alternative embodiments, the distortion measurement may include a count value which indicates the cost of encoding the motion vector for each block. For example, the count value may increase as the estimated header information required to be encoded for each block increases. In an embodiment, a shape selection algorithm is used to measure the distortion for all "block shape instances". For example, a block shape instance may be a specific location out of all possible locations for a particular shape (grouping) of blocks. In an alternative embodiment, the shape selection algorithm may be used to measure only a subset of the block shape instances. Thus, certain block shapes may be excluded from measurement depending on their size and/or frequency. For example, the shape selection algorithm may choose to ignore all block shape instances having the smallest size, and select only the larger block shape instances on which to perform distortion measurements. Alternatively, the shape selection algorithm may choose to perform the distortion measurement on only the smallest block shapes, and then generate distortion measurements for the larger block shape instances as a sum of the distortion measurements from the smaller block shape measurements. The algorithm may then determine the number of motion vectors to store for each block shape instance. In an embodiment, the algorithm selects only the single best motion vector to be stored, in order to minimize computation and resource use. In alternative embodiments, the algorithm may store multiple "best" motion vectors, thus achieving better encoding quality. The combined list of best motion vectors for all block shape instance is known as the "motion vector map," and may be continuously updated throughout the distortion measurement step. In an embodiment, each motion vector map is stored between refinement stages. For example, it is possible that in a subsequent refinement stage, no motion vectors in among the chosen candidates has a lower distortion measurement than the that of the best motion vector from a previous refinement stage, from a candidate in a completely different portion of the frame. Thus, storing the motion vector map intermittently guarantees that the absolute best results are always saved. In an alternative embodiment, steps 310-330 of a refinement stage may be skipped in order to save DRAM bandwidth. This may be done under an assumption that a previous refinement stage has already loaded a sufficient amount of data around each candidate search region.

Figure 7:
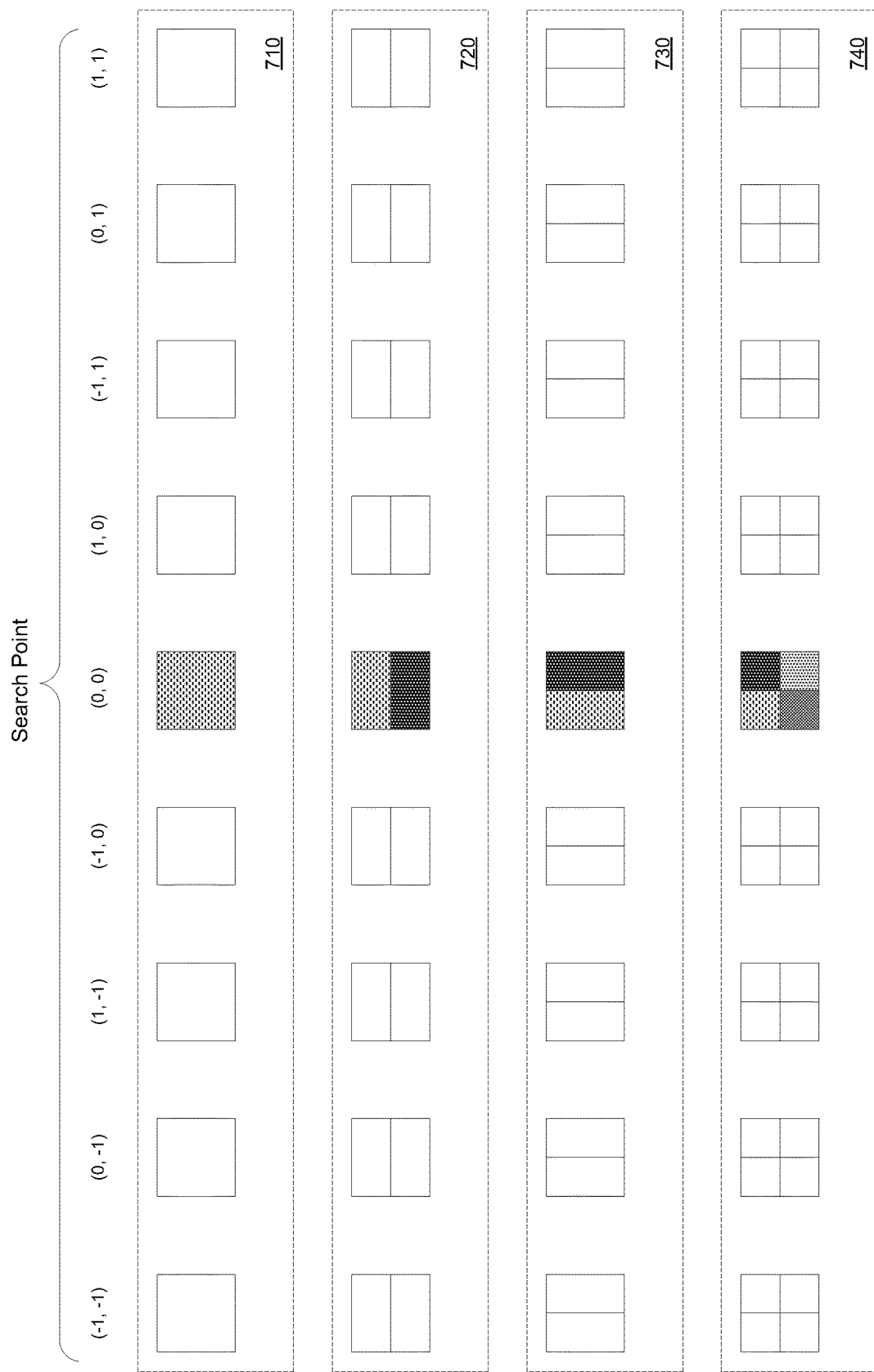
FIG. 7 illustrates a distortion measurement according to an embodiment of the invention.
Figure 8:
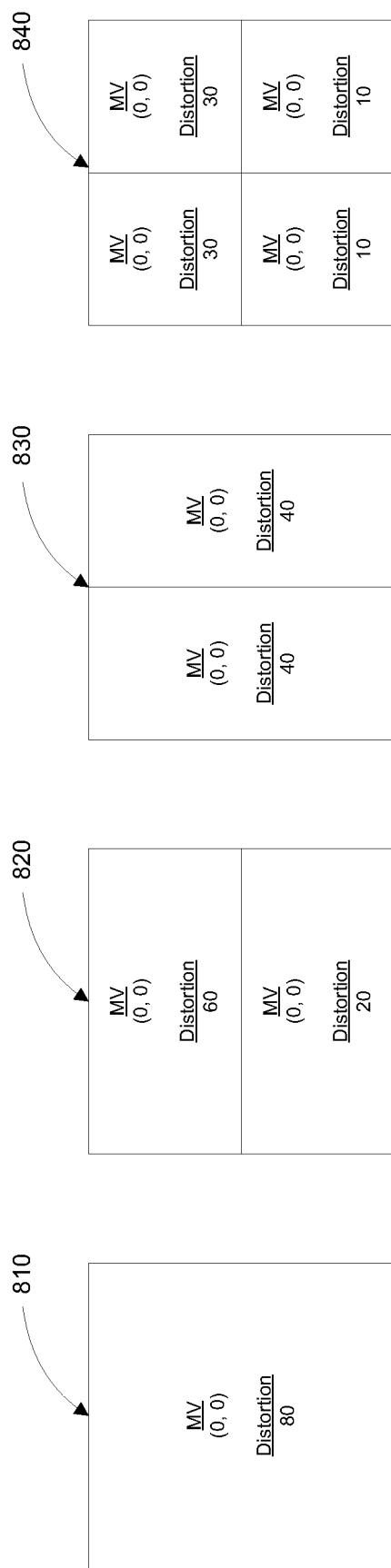
FIG. 8 illustrates a motion vector map according to an embodiment of the invention.

FIG. 7 illustrates a distortion measurement according to an embodiment of the invention. The embodiment of FIG. 7 comprises block shape instances 710-740 used for searching nine different search points (−1, −1) to (1, 1) around a first candidate (0, 0). Thus, the search points comprise a 3×3 area around the first candidate. For the purposes of discussion, it is assumed that the block shape instances are all relative to a 16×16 macroblock, and any block shape instances smaller than 8×8 are ignored. Thus, block shape 710 is 16×16 in size, block shape 720 is 16×8 in size, block shape 730 is 8×16 in size, and block shape 730 is 8×8 in size. The shaded regions of FIG. 7 correspond to the best (e.g., lowest) distortion measurements for each block shape instance. In this example, search point (0, 0) yields the best distortion measurements for every one of the block shape instances. Specifically, with regard to search point (0, 0): block shape 710 yields a distortion measurement of 80; the upper instance of block shape 720 yields a distortion measurement of 60, while the lower instance yields a distortion measurement of 20; block shape 730 yields two distortion measurements of 40; and the two upper instances of block shape 740 yield distortion measurements 30, while the two lower instances yield distortion measurements of 10. The resulting motion vector map is illustrated in FIG. 8; wherein block shape instances 810, 820, 830, and 840, correspond to the block shape instances 710, 720, 730, and 740, respectively, of FIG. 7. It is important to note here that distortion measurements for smaller block shape instances may be summed together to form distortion measurements for larger block shape instances.

Figure 9:
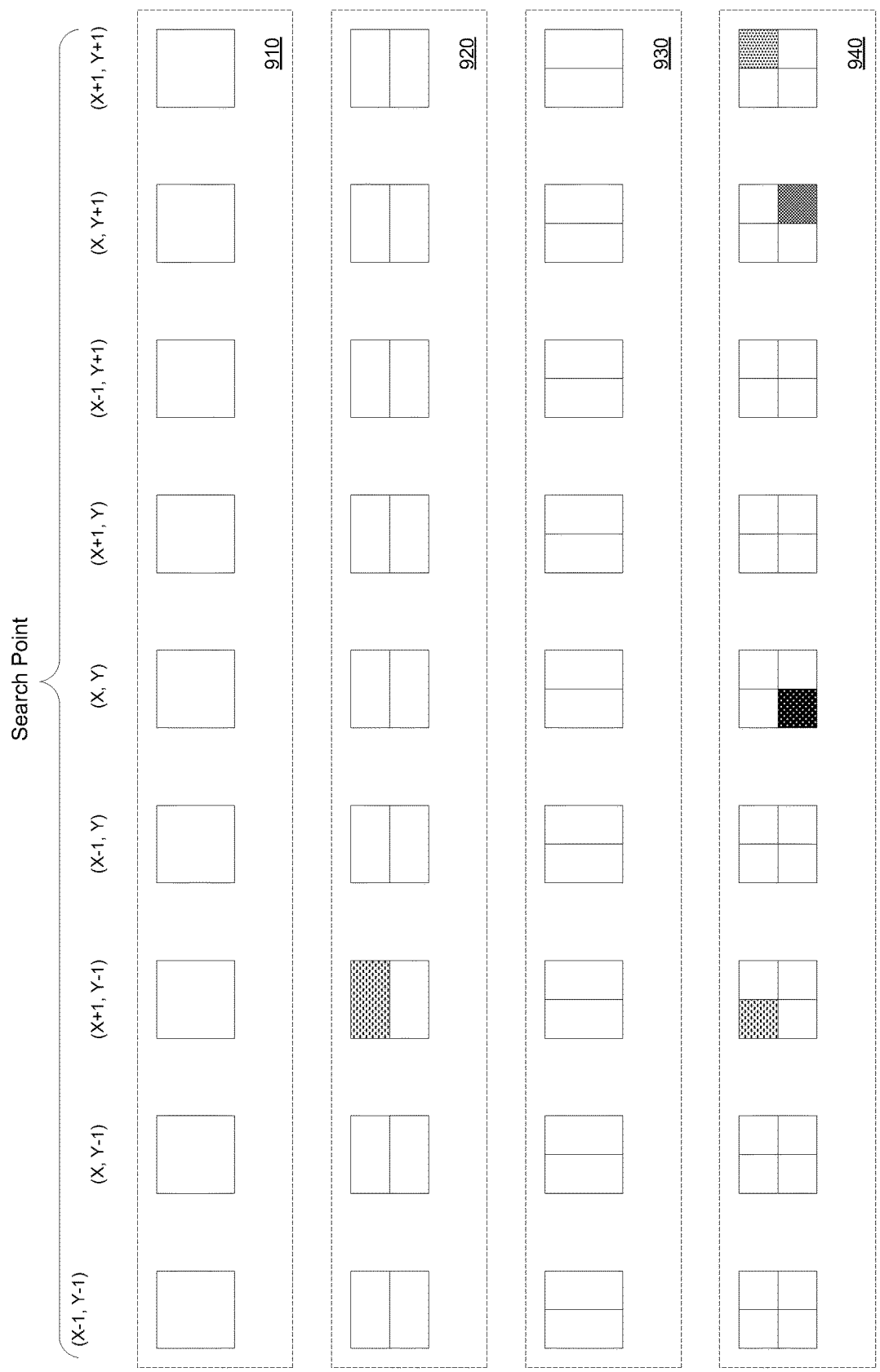
FIG. 9 illustrates a distortion measurement according to another embodiment of the invention.
Figure 10:
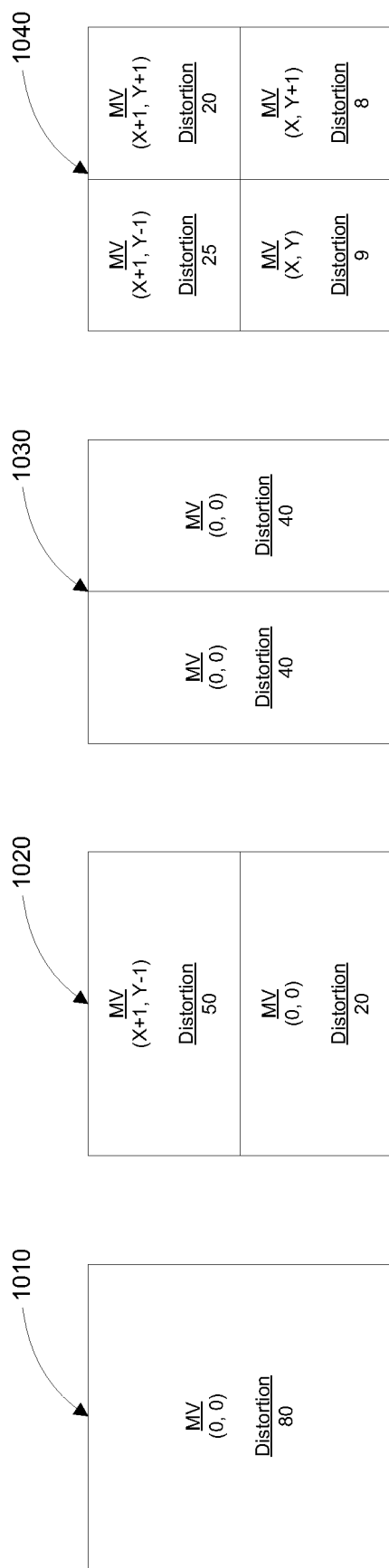
FIG. 10 illustrates a motion vector map according to another embodiment of the invention.

FIG. 9 illustrates a distortion measurement according to another embodiment of the invention. Continuing off the example of FIG. 7, the embodiment of FIG. 9 comprises block shape instances 910-940 used for subsequently searching nine different search points (X−I, Y−1) to (X+1, Y+1) around a second candidate (X, Y). The shaded regions of FIG. 9 correspond to the best (e.g., lowest) distortion measurements for each block shape instance, but only if they are better than the previous distortion measurements, for the respective block shape instance, around the first candidate. In this example, search point (X+1, Y−1) yields a better distortion measurement for block shape 920 (i.e., the size 16×8 block shape instance), as well as block shape 940 (i.e., the size 8×8 block shape instance). Furthermore, it can be seen that search points (X, Y), (X, Y+1), and (X+1, Y+1) each yield better distortion measurements for block shape 920 than was previously found with respect to the first candidate. Specifically, with regard to block shape instance 920, the upper instance at search point (X+1, Y−1) yields a distortion measurement of 50 (<10 compared to the first candidate). With respect to block shape instance 940, the upper-left instance at search point (X+1, Y−1) yields a distortion measurement of 25 (<5); the lower-left instance at search point (X, Y) yields a distortion measurement of 9 (<1); the lower-right instance at search point (X, Y+1) yields a distortion measurement of 8 (<2); and the upper-right instance at search point (X+1, Y+1) yields a distortion measurement of 20 (<10). The resulting motion vector map is illustrated in FIG. 10; wherein block shape instances 1010, 1020, 1030, and 1040, correspond to the block shape instances 910, 920, 930, and 940, respectively, of FIG. 9. It is important to note that the motion vector map of FIG. 10 now contains motion vectors (MV), as well as distortion measurements, from different candidates.

Referring back to FIG. 3, at step 350, a determination is made as to whether or not the current refinement stage is the final refinement stage. For example, after the distortions are measured at step 340, there may still be more candidates than desirable, given the hardware resource limitations. Alternatively, there may be more candidates than required for relatively high quality video encoding. Thus, further refinement may be necessary. In an embodiment, the shape selection algorithm may make this final determination. For example, a large sum of absolute differences (SAD) may be measured with respect to the particular motion vector, and the measurement may then be used as a threshold for determining whether there is sufficient activity in the macroblock to perform further motion search and refinement.

Assuming it is determined, at step 350, that the last refinement stage had not yet been reached, candidates must now be selected for the next refinement stage, based on the measured distortions, at step 360. In an embodiment, a voting scheme is used to select the best candidates for further refinement. According to the voting scheme, the number of times a particular motion vector appears in the motion vector map is first counted. This count value corresponds to the number of "votes" that the particular motion vector receives. Next, the best motion vectors are selected, based on their number of votes. In an embodiment, the total number of best motion vectors selected may be constant for each macroblock. In alternative embodiments, the number of best motion vectors may vary for each macroblock, depending on the load-balancing constraints. The size of the block shape instance from which a vote was received may be useful in settling a tie. For example, the motion vector with a larger block shape instance voting for it may be selected in case of a tie. In alternative embodiments, motion vector selection may be performed at random in case of ties. In an embodiment, weights may be assigned to the votes. Weight assignment may be done in a number of different ways. For example, a vote for a motion vector that had the smallest distortion measurement for a block shape instance may be assigned a greater weight than a vote for any other motion vector of the same block shape instance. Alternatively, larger block shape instances may cast more votes for their best motion vectors compared to smaller block shape instances.

Figure 11:
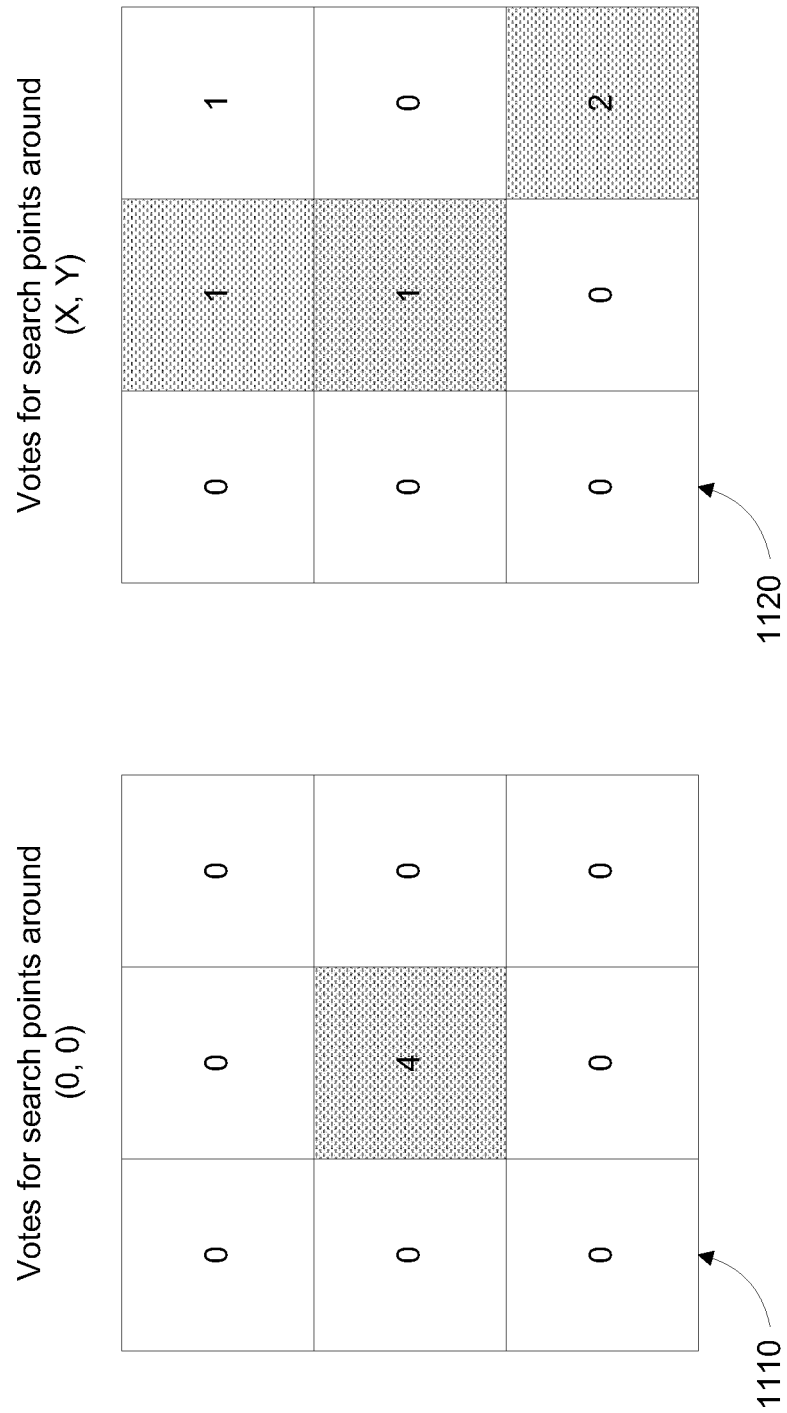
FIG. 11 illustrates a voting scheme according to an embodiment of the invention.

FIG. 11 illustrates a voting scheme according to an embodiment of the invention. The voting scheme of FIG. 11 comprises voting grids 1110 and 1120. Continuing off the example of FIGS. 7, 8, 9 and 10, each square of a voting grid represents one of the nine different search regions around the given candidate (wherein the candidate corresponds to the square in the center). For example, the center square of grid 1110 corresponds to the candidate (0, 0) and the center square of grid 1120 corresponds to the candidate (X, Y). In reference to the motion vector map of FIG. 8, the motion vector (0, 0) appears with each of the block shapes 810-840, and it is also the only motion vector on the motion vector map. Thus, as shown on voting grid Ill 0, the motion vector (0, 0) receives a total of four votes. Referring now to the motion vector map of FIG. 10, it can be seen that the motion vector (X+1, Y−1) appears with block shapes 1020 and 1040; and motion vectors (X, Y), (X, Y+1), and (X+1, Y+1) each appear once with block shape 1040. None of the remaining search regions around the candidate (X, Y) ever appear on the motion vector map. This translates to two votes for motion vector (X+1, Y−1), and one vote for each of the motion vectors (X, Y), (X, Y+1), and (X+1, Y+1), as shown on voting grid 1120. Now assume that only four candidates are selected for further refining. The combination of voting grids 1110 and 1120 show that there are two candidates with more than one vote and a total of three candidates receiving exactly one vote. Thus, there is a three-way tie from which two candidates must be selected. Using any one of the tie-breakers discussed above (which includes simply selecting at random), it may be determined that the four best candidates are those corresponding to the shaded squares. In this case, motion vectors (0, 0), (X+1, Y−1), (X, Y), and (X, Y+1) are chosen for further refinement in the next refinement stage.

Referring back to FIG. 3, if it is determined at step 350 that the current refinement stage is the last, the results from all the previous refinement stages will then be processed, using motion compensation, at step 370. In an embodiment, the predicted motion vector blocks chosen by the shape selection algorithm are first extracted. For example, the motion compensation may reset the motion vector map before the distortion measurements are collected in the last refinement stage. This forces the shape selection algorithm to choose only the candidates that have already been loaded from DRAM into the on-chip memory, thus allowing for motion compensation to take place without loading any new data from DRAM. At this point there is no need to pick new candidates, and instead the shape selection algorithm picks a best final partitioning for a macroblock. In particular, it is necessary to know the predicted motion vector, since the bitstream encodes the difference between the actual motion vector and the predicted motion vector. In an embodiment, the predicted motion vector is calculated as a median of three neighboring sub blocks (e.g., block shapes). In other words, the actual motion vectors used for a median calculation depend on the block shape instances chosen by causal neighboring blocks (e.g., to the left and/or top). Thus, there is a serial dependency for an exact calculation of the predicted motion vector, since the cost of a motion vector depends on the motion vectors chosen by its neighbors. In an embodiment, an approximation is used to allow consecutive sub blocks (which would otherwise have a serial dependency) to be processed in parallel.

Figure 12:
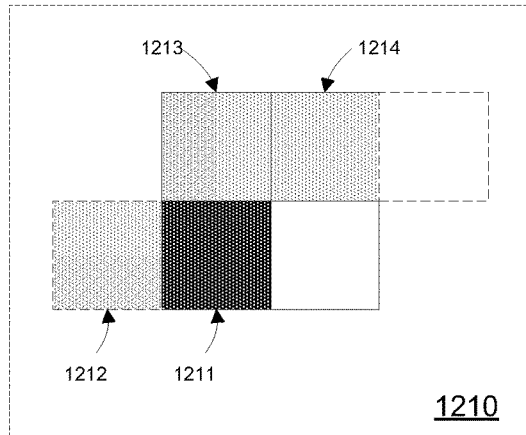
FIG. 12 illustrates a calculation of a predicted motion vector according to an embodiment of the invention.
Figure 12:
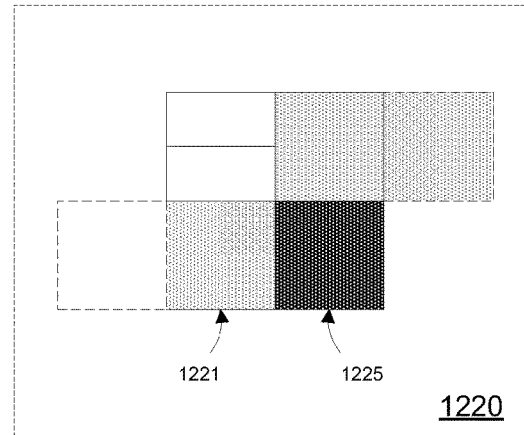
Figure 12:
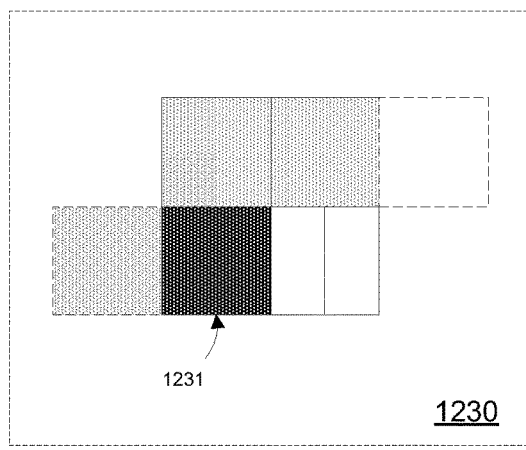
Figure 12:
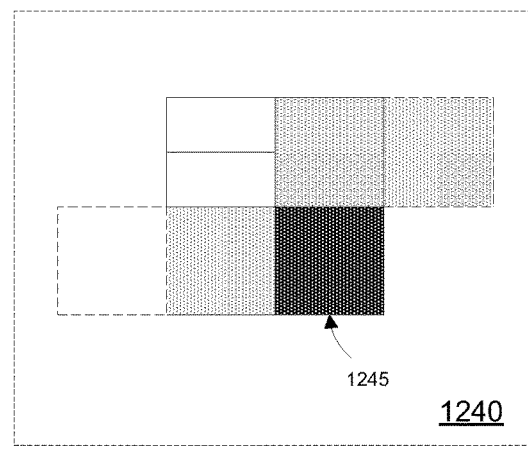
Figure 12:
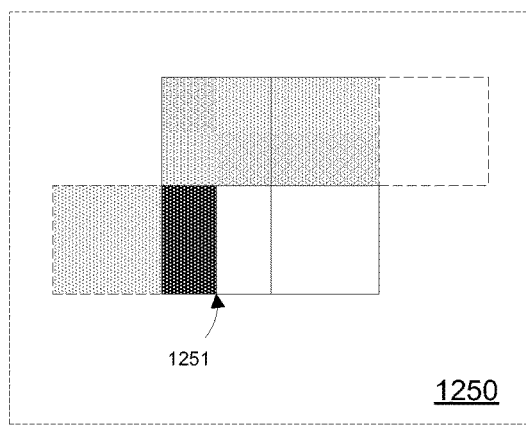
Figure 12:
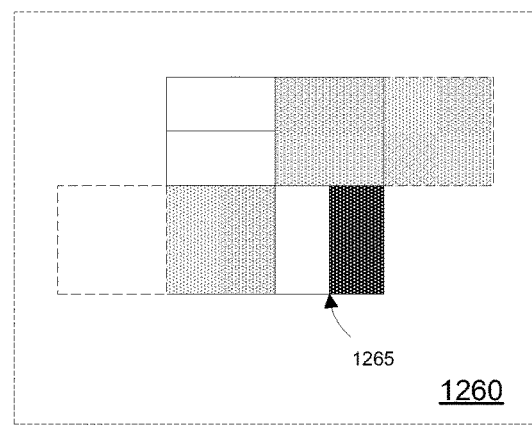

FIG. 12A illustrates a calculation of a predicted motion vector according to an embodiment of the invention. The embodiment comprises macroblocks 1210, 1220, 1230, 1240, 1250, and 1260. For purposes of discussion, it is assumed that each macroblock is 16×16 in size, and comprises multiple sub blocks (i.e., block shapes) of varying sizes (e.g., 4×8, 8×4, 8×8). The sub blocks to the bottom left and top right of each 16×16 macroblock correspond to sub blocks from neighboring macroblocks, and are therefore illustrated with a dotted outline. In this example, macroblock to the left corresponds to a respective macroblock to the right. That is to say, macroblocks 1210 and 1220 correspond to the same macroblock; macroblocks 1230 and 1240 correspond to the same macroblock; and macroblocks 1250 and 1260 correspond to the same macroblock. Referring now to macroblock 1210, sub blocks 1212-124 (the lighter shaded regions) correspond to the three sub blocks from which the median 1211 (the darker shaded region) is calculated. Thus, in reference to macroblock 1220, in order to calculate the predicted motion vector 1225 exactly, the sub block 1221 must be processed first. In other words, the predicted motion vector 1211, of macroblock 1210, must first be calculated. This serial dependency is further compounded if the neighboring sub blocks are smaller than 8×8 in size, as the shape of the sub blocks affects the median calculation. In an embodiment, sub blocks smaller than 8×8 are given the same predicted motion vectors as the 8×8 blocks they are part of. This approximation is further illustrated with respect to macroblocks 1230-1260. For example, an 8×8 partitioning is used for the block 1231 of macroblock 1230, thus an 8×8 partitioning is also used for the block 1245 of macroblock 1240. Similarly, since a 4×8 partitioning is used for the (8×8) block 1251 of macroblock 1250, a 4×8 partitioning is therefore also used for the (8×8) block 1265 of macroblock 1260. Using this technique, the predicted motion vectors of macroblocks 1210, 1230, and 1250, and the predicted motion vectors of macroblocks 1220, 1240, and 1260, may be calculated in parallel, respectively.

FIG. 12B, shows another example approximation technique to calculate the predicted motion vector for various sub blocks within two neighboring 8×8 blocks. According to the approximation technique, the blocks smaller than 8×8 use the same predicted motion vectors as the 8×8 blocks that they are a part of. For example, although sub block 1271 is partitioned as two 4×8 sub blocks on the left in macroblock 1270, each 4×8 sub block 1272 and 1273 is assumed to have the same motion vector as the 8×8 block 1271 it is part of while processing sub block 1286 of macroblock 1280. Thus, the serial dependency is reduced between sub blocks 1272 and 1286.

The ability to process macroblocks in parallel is especially useful when applied to the technique of strip-mining. Within a processor, an entire strip of data is processed each time a kernel is invoked. A strip comprises a series of consecutive macroblocks, all on the same row, and the length of the strip is typically smaller than (or equal to) the number of macroblocks in a row of the frame. A pipeline comprises a series of kernels, and within each kernel there is a main loop which generally processes one macroblock per loop iteration. In this manner, each strip is processed in order, until the whole frame has been processed; and the next pipeline will then process the entire frame in the same manner. Thus, all the relevant data for the whole frame is cycled from the off-chip memory through the on-chip memory and back out to off-chip memory at least once for each pipeline. However, applying this technique to a parallel processor is more difficult, due to the serial dependency that is typically associated with adjacent macroblocks on the strip (as discussed above). The ability to process macroblocks in parallel, using the approximation described above in reference to FIG. 12, thus allows a parallel processor to take full advantage of the strip-mining technique.

When processing a macroblock, special attention needs to be paid to transform coefficients. For example, when using a 4×4 transform on a 16×16 macroblock, there is a reasonably high chance that only a single coefficient in any 8×8 or 16×16 block will be nonzero. Such isolated coefficients can be very expensive to encode, yet may have very little impact on the quality of the final image that is reconstructed by the decoder. In an embodiment, an expensive-coefficient-detection algorithm is used to calculate the worth of each transform block. Thus, when using a 4×4 transform, the expensive-coefficient-detection algorithm calculates the worth of each 4×4 block within the macroblock. It is assumed that the first few coefficients of a block, in "zig-zag" order, represent the low frequency spectrum of the original signal. These low-frequency coefficients may have a greater impact on rate distortion than other coefficients within the block, and thus require more accurate evaluation.

In an embodiment, an expensive-coefficient-detection algorithm is used to calculate "run-levels" (i.e., the length of a run of zeroes) for only the low-frequency coefficients, and a simple sum may be used for the remainder of the coefficients, in order to detect whether a block is too costly for distortion gain. The algorithm then assigns a "worth" to each run-level, indicating how important the coefficient is to the visual integrity of the block prediction as well as how cheap the coefficient is to encode into the bitstream. Thus, the more important the coefficient is to the visual integrity the more it is worth, and conversely, the more bits that are required to encode the coefficient, the less it is worth. For example, if there is a run of zeros followed by a 1 or a −1, then the coefficient is assigned a worth based on the length of the run. For runs of zero to five the run-level may be worth 3, 2, 2, 1, 1, and 1, respectively, and the worth of any runs greater than five may be 0. The total worth of the low-frequency coefficients are then summed together. The absolute values of the remaining coefficients are then summed together and scaled by a scaling factor. This scaled sum is then added to the total worth of the low-frequency coefficients in order to obtain the total worth of the entire block. The total worth of each of the transform blocks are then combined (i.e., summed) to obtain the total worth of each larger block. During such an expansion process, certain blocks may be "zeroed" (e.g., the total worth of the block is reduced to 0) if the total worth of that block does not meet a threshold value. This process may then be expanded until the total worth of the entire macroblock is determined.

Figure 13:
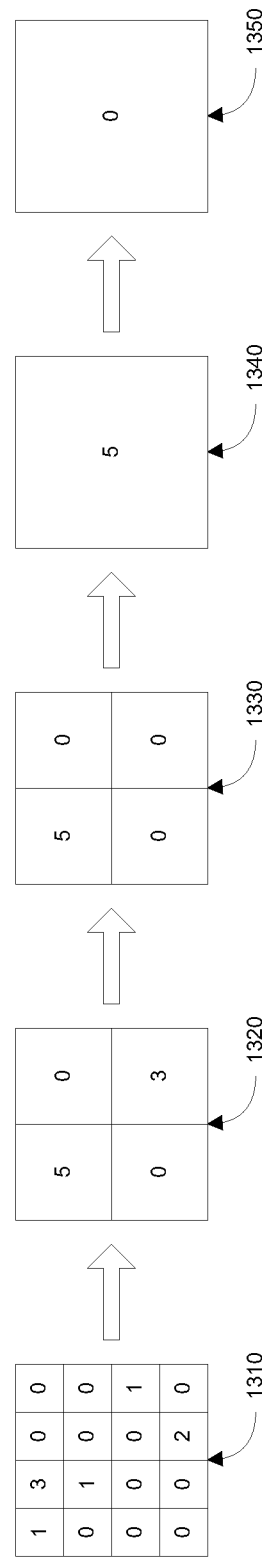
FIG. 13 illustrates a total worth calculation for a macroblock according to an embodiment of the invention.

FIG. 13 illustrates a total worth calculation for a macroblock according to an embodiment of the invention. It is assumed that the thresholds for 8×8 blocks and 16×16 blocks are 5 and 6, respectively (e.g., $T_{8\times8}=5$ and $T_{16\times16}=6$). At step 1310, the total worth of each 4×4 block within the macroblock is calculated, and the total worth of the four blocks in each corner of the macroblock are summed together and presented as the total worth for respective 8×8 blocks at step 1320. At this point, the total worth of the bottom-right block of 1320 is less than the threshold value for 8×8 blocks ($T_{8\times8}>3$), thus the total worth of this block is subsequently zeroed, as shown at step 1330. At step 1330, the total worth of all four 8×8 blocks is summed up once again to obtain the total worth for the entire 16×16 macroblock, as shown at step 1340. Now since the total worth of the 16×16 macroblock is less than the threshold value for 16×16 blocks (T 16×16>5), the entire 16×16 macroblock is zeroed at this point as shown in step 1350. Thus, after expansion and worth adjustment, the macroblock in this example yields a final total worth of zero.

Run-level calculation is very computationally expensive. However, this process is greatly streamlined by limiting the number of coefficients on which to perform this computation. On the other hand, the simple sum of the remaining coefficients is less accurate, but much faster. In this manner, the expensive-coefficient-detection algorithm balances performance with quality by using the more accurate but expensive processing for the important coefficients only, and the less accurate but faster processing for the less important coefficients.

Entropy coding is a technique used to minimize the number of bits required to encode a series of syntax elements (e.g., macroblocks, transform coefficients, and/or motion vectors), by using fewer bits to encode commonly occurring values of each syntax element, and more bits to encode rarely occurring values of syntax elements. For example, each syntax element is mapped to a "codeword" and each codeword has a length, in number of bits, and a value. To generate the final output bitstream, the values of all the codewords are concatenated in sequence. In order to take full advantage of a system's parallel processing capabilities it is desirable to devise a way to assemble a bitstream in parallel, which can then be decoded serially (assuming most video decoders are serial). However, the problem of parallelization is compounded, because each codeword may be a different number of bits, and the number of bits for each codeword is determined dynamically.

In an embodiment, a packing algorithm outputs ("packs") consecutive codewords, within a group, on separate parallel processing elements (lanes). Each group produces a portion of the final bitstream, referred to herein as a "sub-stream". For purposes of discussion, it is assumed that the bitstream comprises 32-bit data words, and the local register file (LRF) and the DRAM can only be accessed in multiples of 32 bits (note this technique may be expanded to other architectures requiring fewer or more than 32 bits). Thus, a complication arises when codewords from two different lanes need to be backed into the same 32-bit data word in the bitstream. In order to streamline the bitstream assembly process, each sub-stream is made to be an exact multiple of 32-bits. When the combined length of all the codewords in a lane is not a multiple of 32, some bits from that lane must be combined with bits from the next lane before being output. In an embodiment, each lane sums up the total number of bits among all of the codewords in its array for a given macroblock, and then counts the number of bits in the preceding lanes (the first lane counts the number of bits on the last lane, from a previous macroblock, that did not form an entire 32-bit data word), to identify if certain bits from codewords of different lanes need to be combined. The following is a pseudocode which may be used to limit the impact of the serial dependency of the packing algorithm:

```
#define NUM_CODES_PER_LANE_PER_MB        8 //The value 8 is just an example
#define MAX_PACKED_WORDS_PER_LANE_PER_MB  8 //The value 8 is just an example
    for (m = 0; m < strip_size; m++) {
        for (n = 0, sum = 0; n < NUM_CODES_PER_LANE_PER_MB; n++)
            substream_length += code_array[n].length;
        // Sum up substream_length in all lanes with lane_id( ) less than mine
        my_start = get_num_bits_in_previous_lanes(substream_length) % 32;
        output_loc = 0;
        window.length = my_start;
        window.value = 0;
        for (n = 0; n < NUM_CODES_PER_LANE_PER_MB; n++) {
            // Add next codeword to current 32-bit window.
            // If the 32-bit window fills up, output the first 32 bits in out_val
            // and set do_output to true.
            pack_next_codeword(code_array[n], &window, &do_output, &out_val);
            if (do_output) output_array [output_loc++] = out_val;
        }
        n = 1;
        my_start_save = my_start;
        leftover = window;
        window.length = 0;
        window.value = 0;
        while on each lane (my_start > 0) {
            code= get_leftover_bits(leftover, lane_id( ) - n);
            if (my_start > 0) pack_next_codeword(code, &window, &dummy, &dummy);
            my_start -= code. length;
            n++;
        }
        if (my_start_save > 0) output_array[0] |= window. value;
        code_array += NUM_CODES_PER_LANE_PER_MB;
        output_array += MAX_PACKED_WORDS_PER_LANE_PER_MB;
    }
```

The operation of this kernel is further exemplified in reference to Tables 1 and 2. For purposes of discussion, it is assumed that the machine used in this example has only four parallel lanes. The input (Table 1) comprises at most eight codewords per lane and each code may be up to 32 bits in length. The codewords are ordered within each lane (and between lanes) from Lane 0 to Lane 3. The output array (Table 2) assumes that the substream produced by each lane has a maximum length of eight 32-bit data words.

TABLE 1

Input code arrays for this macroblock in LRF

| Input Field | Lane 0 | Lane 1 | Lane 2 | Lane 3 |
|---|---|---|---|---|
| in[0] | 12 | — | — | 18 |
| in[1] | — | 24 | — | — |
| in[2] | 13 | — | 5 | — |
| in[3] | — | 5 | 2 | — |
| in[4] | — | — | — | 14 |
| in[5] | 7 | 31 | 1 | 22 |
| in[6] | — | 3 | — | — |
| in[7] | 18 | — | 2 | 15 |

Only code lengths are shown; code values are ignored for illustrative purposes.
"—" indicates a NULL code (i.e., it doesn't contribute to final bitstream)

TABLE 2

Packed arrays for this macroblock

| Output Field | Lane 0 | Lane 1 | Lane 2 | Lane 3 |
|---|---|---|---|---|
| out[0] | Packed0 | Packed1 | — | Packed3 |
| out[1] | — | Packed2 | — | — |
| out[2] | — | — | — | — |
| out[3] | — | — | — | — |
| out[4] | — | — | — | — |
| out[5] | — | — | — | — |
| out[6] | — | — | — | — |
| out[7] | — | — | — | — |

"PackedX" indicates a used 32-bit value, and "—" indicates an empty value.

Assuming the lanes operate in a single instruction multiple data (SIMD) fashion, each lane must process the same number of codewords. In an embodiment, it is assumed that all codewords in the array in each lane are valid. This assumption allows for the performances for very high bitrates and very low bitrates to be the same, which may be advantageous when handling varying bitrate requirements.

In an alternative embodiment, a preprocessing kernel may be executed, for lowering performance requirements at lower bitrates. The preprocessing kernel counts the number of valid codewords and compresses them to the beginning of the codeword array in each line. The kernel then outputs the maximum number of valid codewords across the lanes (as indicated by the "used" output field), for each macroblock. The packing algorithm would then only execute this reduced number of iterations for each macroblock. The operation of the preprocessing kernel is further exemplified in reference to Tables 3 and 4.

TABLE 3

Input code arrays for this macroblock in LRF

| Input Field | Lane 0 | Lane 1 | Lane 2 | Lane 3 |
|---|---|---|---|---|
| in[0] | 12 | — | — | 18 |
| in[1] | — | 24 | — | — |
| in[2] | 13 | — | 5 | — |
| in[3] | — | 5 | 2 | — |
| in[4] | — | — | — | 14 |
| in[5] | 7 | 31 | 1 | 22 |
| in[6] | — | 3 | — | — |
| in[7] | 18 | — | 2 | 15 |

Only code lengths are shown; code values are ignored for illustrative purposes.
"—" indicates a NULL code (i.e., it doesn't contribute to final bitstream)

TABLE 4

Output code arrays for this macroblock in LRF

| Output Field | Lane 0 | Lane 1 | Lane 2 | Lane 3 |
|---|---|---|---|---|
| used | 4 | 4 | 4 | 4 |
| out[0] | 12 | 24 | 5 | 18 |
| out[1] | 13 | 5 | 2 | 14 |
| out[2] | 7 | 31 | 1 | 22 |
| out[3] | 18 | 3 | 2 | 15 |
| out[4] | — | — | — | — |
| out[5] | — | — | — | — |
| out[6] | — | — | — | — |
| out[7] | — | — | — | — |

"—" indicates an empty value.

If all of the sub-streams were the same length, assembling them into a single bitstream would be a trivial matter. However, because sub-streams vary in length, each lane will have a different number of elements to store to memory.

In an embodiment, a memory system is built for storing variable record lengths. For example, the first field of each record may contain the length of that particular record. Thus, address generators may increment the address by the particular record length specified, rather than by the stride between records on consecutive lanes. An example is herein discussed in reference to Tables 5 and 6.

TABLE 5

Input code arrays for this macroblock in LRF

| Input Field | Lane 0 | Lane 1 | Lane 2 | Lane 3 |
|---|---|---|---|---|
| in[0] | 12 | 24 | 5 | 18 |
| in[1] | 13 | 5 | 2 | 14 |
| in[2] | 7 | 31 | 1 | 22 |
| in[3] | 18 | 3 | 2 | 15 |

Only code lengths are shown; code values are ignored for illustrative purposes.

TABLE 6

Output code arrays for this macroblock in LRF

| Output Field | Lane 0 | Lane 1 | Lane 2 | Lane 3 |
|---|---|---|---|---|
| used | 1 | 2 | 0 | 3 |
| out[0] | Packed0 | Packed1 | — | Packed3 |
| out[1] | — | Packed2 | — | Packed4 |
| out[2] | — | — | — | Packed5 |
| out[3] | — | — | — | — |

"PackedX" indicates a used 32-bit value, and "—" indicates an empty value.

For purposes of discussion, in reference to Table 5, it is assumed that the input only comprises at most four codewords per lane (as opposed to eight in the previous examples). Referring now to Table 6, each output record requires an extra "used" field in each lane to specify the number of 32-bit values in the array in the particular lane. Still referring to Table 6, the variable length memory system reads all five of the words in each lane, but writes only the values indicated in each lane as "PackedX", where X is an integer value. The first word in each lane (the used output field) specifies, to the address generators in the memory system, which values are valid and by how much to increment the address pointer by when storing data words in each lane. For example, the two data words in Lane 1 are stored in the array in the DRAM immediately behind the word in Lane 0, and so on. The next output in the strip begins in the LRF after the fifth word in word in each lane (i.e., not necessarily directly after the last valid element in each lane).

In another embodiment, a transpose is performed, such that each consecutive 32-bit data word of the sub-stream is in a different lane. A conditional output stream may then be used to output the sub-streams, such that only the lanes with valid words output data. After all the sub-streams are output in order, a single assembled bitstream is left residing in the LRF which may then be easily written to the DRAM. Continuing off the example discussed above in reference to Tables 5 and 6, a utilization of the transpose and conditional output stream (rather than using a memory system which supports variable record lengths) is exemplified with respect to Tables 7, 8, 9, and 10. It should be noted this results in a packed array of 32-bit data words that are in order, and striped across the lanes. In an alternative embodiment, a simple sequential memory store may be used to efficiently store the striped array to the bitstream buffer in memory.

TABLE 7

Input code arrays for this macroblock in LRF purposes.

| Input Field | Lane 0 | Lane 1 | Lane 2 | Lane 3 |
|---|---|---|---|---|
| in[0] | 12 | 24 | 5 | 18 |
| in[1] | 13 | 5 | 2 | 14 |
| in[2] | 7 | 31 | 1 | 22 |
| in[3] | 18 | 3 | 2 | 15 |

Only code Lengths are shown; code values are ignored for illustrative

TABLE 8

Packed arrays for this macroblock

| Variable | Lane 0 | Lane 1 | Lane 2 | Lane 3 |
|---|---|---|---|---|
| packed[0] | Packed0 | Packed1 | — | Packed3 |
| packed[1] | — | Packed2 | — | Packed4 |
| packed[2] | — | — | — | Packed5 |
| packed[3] | — | — | — | — |

"PackedX" indicates a used 32-bit value, and "—" indicates an empty value.

TABLE 9

Transposed arrays for this macroblock

| Variable | Lane 0 | Lane 1 | Lane 2 | Lane 3 |
|---|---|---|---|---|
| packed[0] | Packed0 | — | — | — |
| packed[1] | Packed1 | Packed2 | — | — |
| packed[2] | — | — | — | — |
| packed[3] | Packed3 | Packed4 | Packed5 | — |

"PackedX" indicates a used 32-bit value, and "—" indicates an empty value.

TABLE 10

Output for this macroblock in the LRF empty value.

| LRF Index | Lane 0 | Lane 1 | Lane 2 | Lane 3 |
|---|---|---|---|---|
| packed[0] | Packed0 | Packed1 | Packed2 | Packed3 |
| packed[1] | Packed4 | Packed5 | — | — |
| packed[2] | — | — | — | — |
| packed[3] | — | — | — | — |

"PackedX" indicates a used 32-bit value, and "—" indicates an

In yet another embodiment, conditional output streams are used to directly output the 32-bit data words in each sub-stream. However, the resulting 32-bit data words in the LRF are in no particular order. Thus, in an embodiment, an index may be written out along with each 32-bit word. Then, an indirect memory operation is performed in order to write the 32-bit data words to the DRAM. According to this embodiment, no additional hardware is necessary, and no extra cycles are spent on an inter-lane transposes. An example is herein discussed in reference to Tables 11, 12, 13, and 14.

TABLE 11

Input code arrays for this macroblock in LRF

| Input Field | Lane 0 | Lane 1 | Lane 2 | Lane 3 |
|---|---|---|---|---|
| in[0] | 12 | <u>24</u> | 5 | <u>18</u> |
| in[1] | 13 | <u>5</u> | 2 | <u>14</u> |
| in[2] | <u>7</u> | <u>31</u> | 1 | <u>22</u> |
| in[3] | <u>18</u> | <u>3</u> | 2 | <u>15</u> |

Only code lengths are shown; code values are ignored for illustrative purposes.
An underlined value will trigger a conditional output write in that lane.

TABLE 12

Starting index in each lane

| Lane 0 | Lane 1 | Lane 2 | Lane 3 |
|---|---|---|---|
| 0 | 1 | 3 | 3 |

TABLE 13

Memory index written for each conditional output

| Loop Iteration | Lane 0 | Lane 1 | Lane 2 | Lane 3 |
|---|---|---|---|---|
| 0 | — | 1 | — | 3 |
| 1 | — | — | — | — |
| 2 | 0 | 2 | — | 4 |
| 3 | — | — | — | 5 |

"—" indicates that no value was written to the conduction output streams.

TABLE 14

Output index array in the LRF (corresponding value array not shown)

| LRF Index | Lane 0 | Lane 1 | Lane 2 | Lane 3 |
|---|---|---|---|---|
| 0 | 1 | 3 | 0 | 2 |
| 1 | 4 | 5 | — | — |
| 2 | — | — | — | — |
| 3 | — | — | — | — |

"—" indicates an empty value.

For the purposes of discussion, it is assumed that there are a total of four loop iterations to process the four input codes. If a lane crosses a 32-bit boundary during any iteration, it outputs the completed (and packed) 32-bit value to a conditional stream, and then writes an index to a different conditional output stream. In an embodiment, the index is incremented locally in each lane after each conditional output write. The initial value in each lane for each macroblock may be determined easily from calculations which are already performed by the kernel. Note that the outputs to the conditional streams are not in any particular order in the LRF. Although the outputs happen to be ordered within the lane, this may not always be the case. Also note that the outputs are not necessarily in order, striped across the lanes. However, this may be remedied when the store to memory applies the indices to the values being stored.

It should be noted that although the embodiments disclosed herein are described in terms of their applicability to parallel processors, they are not so limited. A person of ordinary skill in the art may be able to apply the disclosed methods and techniques, advantageously, to a serial processor, or other form of data processing device. Furthermore, it should be noted that although the embodiments disclosed herein are described in terms of their applicability to improving video compression, they are not so limited. For example, such video coding methods may also be used to improve de-interlacing and temporal filtering quality. Moreover, they may be applicable wherever an estimation of the motion of each block in an image is required in a video sequence.

Operational Context

The embodiments described above may be implemented in a programmed general-purpose or special-purpose computer system or in a network of computer systems. Alternatively, the embodiments may be implemented in a device that includes hardwired logic for carrying out the above-described operations, or any combination of programmed processors and hardwired logic.

Figure 14:
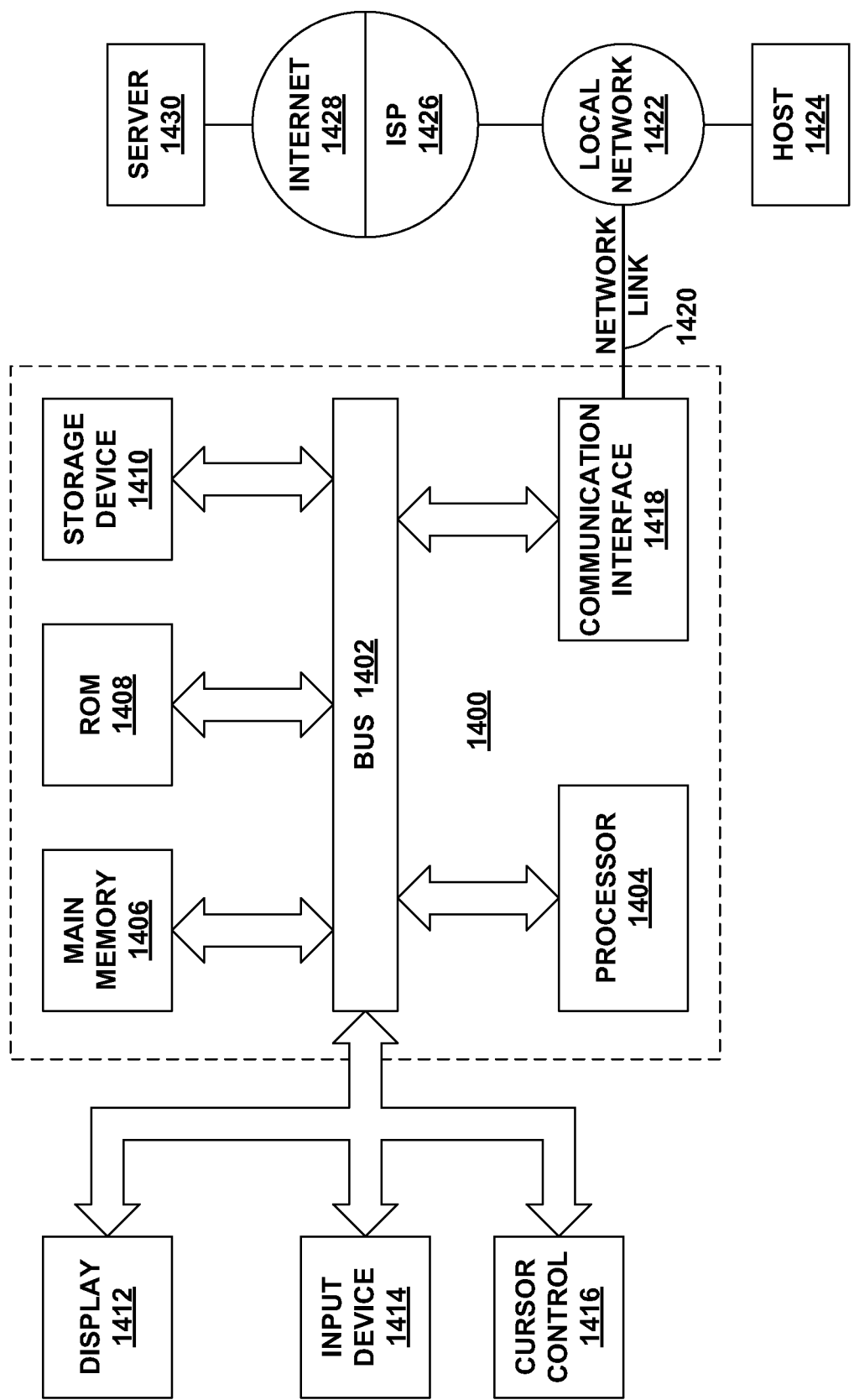
FIG. 14 is a block diagram that depicts a computer system 400 upon which an embodiment of the invention may be implemented.

FIG. 14 is a block diagram that depicts a computer system 1400 upon which an embodiment of the invention may be implemented. Computer system 1400 includes a bus 1402 or other communication mechanism for communicating information, and a processing entity 1404 coupled with bus 1402 for processing information. The processing entity 1404 may include any number of general purpose and/or special purposes processors co-located within a single computing system or distributed over a network of computing systems. Computer system 1400 also includes a main memory 1406, such as a random access memory (RAM) or other dynamic storage device, coupled to bus 1402 for storing information and instructions to be executed by processing entity 1404, including the above described data structures (e.g., tables, variables, etc.) and instructions to be executed by processing entity 1404 to carry out the above-described operations. Main memory 1406 also may be used for storing temporary variables or other intermediate information during execution of instructions to be executed by processing entity 1404. Computer system 1400 further includes a read only memory (ROM) 1408 or other static storage device coupled to bus 1402 for storing static information and instructions for processing entity 1404. A storage device 1410, such as a magnetic disk or optical disk, is provided and coupled to bus 1402 for storing information and instructions, such as the interval total tables described above.

Computer system 1400 may be coupled via bus 1402 to a display 1412, such as a cathode ray tube (CRT), for displaying information to a computer user. An input device 1414, including alphanumeric and other keys, is coupled to bus 1402 for communicating information and command selections to processing entity 1404. Another type of user input device is cursor control 1416, such as a mouse, a trackball, or cursor direction keys for communicating direction information and command selections to processing entity 1404 and for controlling cursor movement on display 1412. This input device typically has two degrees of freedom in two axes, a first axis (e.g., x) and a second axis (e.g., y), that allows the device to specify positions in a plane.

The invention is related to the use of computer system 1400 for implementing the techniques described herein. According to one embodiment of the invention, those techniques are performed by computer system 1400 in response to processing entity 1404 executing one or more sequences of one or more instructions contained in main memory 1406. Such instructions may be read into main memory 1406 from another computer-readable medium, such as storage device 1410. Execution of the sequences of instructions contained in main memory 1406 causes processing entity 1404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processing entity 1404 for execution. Such a medium may take many forms, including but not limited to, non-volatile media, volatile media, and transmission media. Non-volatile media includes, for example, optical or magnetic disks, such as storage device 1410. Volatile media includes dynamic memory, such as main memory 1406. Transmission media includes coaxial cables, copper wire and fiber optics, including the wires that comprise bus 1402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processing entity 1404 for execution. For example, the instructions may initially be carried on a magnetic disk of a remote computer. The remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on bus 1402. Bus 402 carries the data to main memory 1406, from which processing entity 1404 retrieves and executes the instructions. The instructions received by main memory 1406 may optionally be stored on storage device 410 either before or after execution by processing entity 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card or a modem to provide a data communication connection to a corresponding type of telephone line. As another example, communication interface 1418 may be a local area network (LAN) card to provide a data communication connection to a compatible LAN. Wireless links may also be implemented. In any such implementation, communication interface 1418 sends and receives electrical, electromagnetic or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the world wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are exemplary forms of carrier waves transporting the information.

Computer system 1400 can send messages and receive data, including program code, through the network(s), network link 1420 and communication interface 1418. In the Internet example, a server 1430 might transmit a requested code for an application program through Internet 1428, ISP 1426, local network 1422 and communication interface 1418.

The received code may be executed by processing entity 1404 as it is received, and/or stored in storage device 1410, or other non-volatile storage for later execution. In this manner, computer system 1400 may obtain application code in the form of a carrier wave.

The section headings in the preceding detailed description are provided for convenience of reference only, and in no way define, limit, construe or describe the scope or extent of such sections. Also, while the invention has been described with reference to specific exemplary embodiments thereof, it will be evident that various modifications and changes may be made thereto without departing from the broader spirit and scope of the invention. The specification and drawings are, accordingly, to be regarded in an illustrative rather than restrictive sense.

The invention claimed is:

1. A non-transitory computer-readable medium on which are embedded instructions that, when executed on one or more computer devices, improve video coding performance while using a merge mode in motion estimation, the instructions comprising:
    instructions to perform one or more refinement searches on a plurality of candidate regions of a current frame, wherein the plurality of candidate regions comprises a candidate region identified in a reference frame and a plurality of candidate search regions, and wherein the one or more refinement searches reduce the plurality of candidate regions to obtain reduced candidates, by:
        reducing the plurality of candidate regions based, at least in part, on a relative proximity of the plurality of candidate regions; and
        merging two or more redundant candidate regions from the plurality of candidate regions into a single candidate; and
    instructions to code motion data based, at least in part, on the one or more refinement searches.

2. The non-transitory computer-readable medium of claim 1 wherein reducing the plurality of candidate regions further comprises reducing the plurality of candidate regions such that a number of the reduced candidate regions does not exceed a load-balancing constraint.

3. The non-transitory computer-readable medium of claim 2 wherein the load-balancing constraint is based, at least in part, on a complexity of a macroblock, to which a first plurality of candidate search regions belongs.

4. The non-transitory computer-readable medium of claim 1, further comprising instructions to determine one or more distortion values based, at least in part, on the reduced candidate regions wherein the instructions to determine the one or more distortion values comprises instructions to determine the one or more distortion values in a search area around a reduced candidate region.

5. The non-transitory computer-readable medium of claim 1, further comprising:
    instructions to determine one or more distortion values based, at least in part, on the reduced candidate regions wherein the instructions to determine the one or more distortion values comprises instructions to determine the one or more distortion values according to one or more block shapes of a candidate.

6. The non-transitory computer-readable medium of claim 5 wherein the instructions to determine the one or more distortion values further comprises:
    instructions to determine distortion values for a first block shape; and
    instructions to calculate distortion values for the one or more block shapes based, at least in part, on a summation of determined distortion values for the first block shape.

7. The non-transitory computer-readable medium of claim 6 further comprising:
    instructions to store a best candidate associated with the one or more block shapes.

8. The non-transitory computer-readable medium of claim 1 wherein the candidate region identified in the reference frame is identified in a previous refinement search.

9. The non-transitory computer-readable medium of claim 8 wherein the plurality of candidate search regions are identified, at least in part, based on a voting scheme.

10. The non-transitory computer-readable medium of claim 9 wherein the voting scheme comprises:
    assigning a vote to each of a plurality of best candidates based, at least in part, on one or more best candidates from the previous refinement search; and
    resolving tie-breakers based, at least in part, on a respective block size of each of the plurality of best candidates.

11. The non-transitory computer-readable medium of claim 1 wherein coding motion data comprises determining a partitioning for a macroblock.

12. The non-transitory computer-readable medium of claim 11 wherein determining the partitioning for the macroblock comprises approximating a cost of partitions in parallel.

13. The non-transitory computer-readable medium of claim 11 wherein the instructions to perform the one or more refinement searches further comprises instructions to perform the one or more refinement searches across a plurality of macroblocks in parallel.

14. The non-transitory computer-readable medium of claim 11, further comprising:
    instructions to determine one or more distortion values based, at least in part, on the reduced candidate regions wherein the one or more distortion values comprises at least one of a sum of absolute differences, a sum of squared errors, or a Hadamard transform.

15. A non-transitory computer-readable medium on which are embedded instructions that, when executed on one or more computer devices, improve video coding performance while using a merge mode in motion estimation, the instructions comprising:
    instructions to perform one or more refinement searches on a plurality of macroblocks of a current frame, wherein the one or more refinement searches identifies one or more candidate regions in a reference frame, based, at least in part, on a previous refinement search, and based, at least in part, on a voting scheme, wherein the voting scheme:

assigns a vote to each of a plurality of best candidates based, at least in part, on one or more best candidates from the previous refinement search; and resolves tie-breakers based, at least in part, on a respective block size of each of the plurality of best candidates;

instructions to reduce the one or more candidate regions to obtain reduced candidate regions; and instructions to code motion data based, at least in part, on the one or more refinement searches.

16. The non-transitory computer-readable medium of claim 15 wherein the instructions to reduce the one or more candidate regions comprises instructions to reduce the one or more candidate regions such that a number of the reduced candidate regions does not exceed a load-balancing constraint.

17. The non-transitory computer-readable medium of claim 16 wherein the load-balancing constraint is based, at least in part, on a complexity of a macroblock, to which a first plurality of candidate regions belongs.

18. The non-transitory computer-readable medium of claim 15 wherein the instructions to reduce the one or more candidate regions comprises instructions to reduce the one or more candidate regions based, at least in part, on a relative proximity of the one or more candidate regions.

19. The non-transitory computer-readable medium of claim 18 wherein the instructions to reduce the one or more candidate regions further comprises instructions to merge two or more candidate regions into a single candidate regions.

20. The non-transitory computer-readable medium of claim 15, further comprising:

instructions to determine one or more distortion values based, at least in part, on the reduced candidate regions wherein the instructions to determine the one or more distortion values comprises instructions to determine the one or more distortion values in a search area around a reduced candidate region.

21. The non-transitory computer-readable medium of claim 15, further comprising:

instructions to determine one or more distortion values based, at least in part, on the reduced candidate regions wherein the instructions to determine the one or more distortion values comprises instructions to determine the one or more distortion values according to one or more block shapes of a candidate.

22. The non-transitory computer-readable medium of claim 21 wherein the instructions to determine the one or more distortion values further comprises:

instructions to determine distortion values for a first block shape; and instructions to calculate distortion values for the one or more block shapes based, at least in part, on a summation of determined distortion values for the first block shape.

23. The non-transitory computer-readable medium of claim 21 further comprising:

instructions to store a best candidate associated with the one or more block shapes.

24. The non-transitory computer-readable medium of claim 15 wherein the instructions to code motion data comprises instructions to determine a partitioning for a macroblock.

25. The non-transitory computer-readable medium of claim 24 wherein the instructions to determine the partitioning for the macroblock comprises instructions to approximate a cost of partitions in parallel.

26. The non-transitory computer-readable medium of claim 15 wherein the instructions to perform the one or more refinement searches further comprises instructions to perform the one or more refinement searches across the plurality of macroblocks in parallel.

27. The non-transitory computer-readable medium of claim 15, further comprising:

instructions to determine one or more distortion values based, at least in part, on the reduced candidate regions wherein the one or more distortion values comprises at least one of a sum of absolute differences, a sum of squared errors, or a Hadamard transform.

* * * * *